(12) United States Patent
Dravenstadt et al.

(10) Patent No.: US 9,351,518 B2
(45) Date of Patent: *May 31, 2016

(54) PHENOLICS EXTRACTION AND USE

(71) Applicant: Ocean Spray Cranberries, Inc., Lakeville-Middleboro, MA (US)

(72) Inventors: Lowell Vernon Dravenstadt, Lakeville-Middleboro, MA (US); Paula Lent, Lakeville-Middleboro, MA (US); Margarita Gomez, Lakeville-Middleboro, MA (US); Harold L. Mantius, Lakeville-Middleboro, MA (US); Lawrence Rose, Lakeville-Middleboro, MA (US); Stephen Joseph Nojeim, Lakeville-Middleboro, MA (US); Christopher McNamara, Lakeville-Middleboro, MA (US); James Johnson, Lakeville-Middleboro, MA (US)

(73) Assignee: Ocean Spray Cranberries, Inc., Lakeville-Middleboro, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/800,231

(22) Filed: Jul. 15, 2015

(65) Prior Publication Data

US 2015/0359253 A1 Dec. 17, 2015

Related U.S. Application Data

(63) Continuation of application No. 13/264,453, filed as application No. PCT/US2010/031492 on Apr. 16, 2010, now Pat. No. 9,113,655.

(60) Provisional application No. 61/170,090, filed on Apr. 16, 2009.

(51) Int. Cl.
*A23C 9/14* (2006.01)
*A23L 3/349* (2006.01)
(Continued)

(52) U.S. Cl.
CPC ............... *A23L 3/349* (2013.01); *A23L 1/3002* (2013.01); *A23L 2/02* (2013.01); *A23L 2/52* (2013.01); *A23L 2/80* (2013.01); *C09B 61/00* (2013.01); *A23V 2002/00* (2013.01)

(58) Field of Classification Search
CPC ............. A23L 1/025; A23L 1/28; A23L 1/30; A23L 3/3481; C07D 311/62
USPC ....................................................... 426/271
See application file for complete search history.

(56) References Cited

U.S. PATENT DOCUMENTS 4,622,227 A 11/1986 Saleeb et al.
6,210,681 B1 4/2001 Walker et al.
(Continued)

FOREIGN PATENT DOCUMENTS

EP 1913951 4/2008

OTHER PUBLICATIONS

Office Action issued in EP14171966.6 on Jul. 24, 2015 (5 pages).
(Continued)

*Primary Examiner* — Patricia George
(74) *Attorney, Agent, or Firm* — Fish & Richardson P.C.

(57) ABSTRACT

Methods for concentrating phenolics in a solution and compositions related to the concentrated phenolics are provided. In particular, methods and compositions are described relating to concentrated phenolics obtained from cranberry feedstock extracts combined with fumaric acid as beverage additives. Additionally, methods for obtaining phenolics from feedstocks using resin absorbtion and elution are described.

14 Claims, 4 Drawing Sheets

(51) Int. Cl.
  *A23L 1/30* (2006.01)
  *A23L 2/02* (2006.01)
  *A23L 2/52* (2006.01)
  *A23L 2/80* (2006.01)
  *C09B 61/00* (2006.01)

(56) References Cited

U.S. PATENT DOCUMENTS

| | | |
|---|---|---|
| 2002/0055471 A1 | 5/2002 | Bailey et al. |
| 2003/0008057 A1 | 1/2003 | Hynes et al. |
| 2003/0149252 A1 | 8/2003 | Gourdin et al. |
| 2003/0157234 A1 | 8/2003 | Takaichi et al. |
| 2005/0276839 A1 | 12/2005 | Rifkin |
| 2007/0117976 A1 | 5/2007 | Keri et al. |
| 2008/0207770 A1 | 8/2008 | Gourdin et al. |
| 2008/0319052 A1 | 12/2008 | Yasue et al. |
| 2009/0035226 A1 | 2/2009 | Tempesta et al. |
| 2009/0035432 A1 | 2/2009 | Mantius et al. |
| 2009/0093537 A1 | 4/2009 | Soulier et al. |

OTHER PUBLICATIONS

"Sepabeads® SP-207 Bucket of 1000 g—Properties," Sigma-Aldrich—Product Catalog, (retrieved from www.sigmaaldrich.com/catalog/product/supelco/13623u?lang=en&region=NL, May 2012, 2 pages.
Communication issued in EP14171966.6 on Oct. 8, 2014 (4 pages).
European Office Action; Application No. 10 765 302.4-2114; Applicant: Ocean Spray Cranberries, Inc.; mailed Jan. 28, 2013; 5 pages.
European Search Report; Application No. 10765302.4-2114 / 2418970; mailed Jan. 15, 2013; Applicant: Ocean Spray Cranberries, Inc., 7 pages.
International Search Report and Written Opinion; PCT/US10/31492; mailed Jun. 29, 2010 (22 pages).
Office Action issued in EP10765302.4 on Mar. 14, 2014 (5 pages).

PHENOLICS EXTRACTION AND USE

CLAIM OF PRIORITY

This application is a continuation of U.S. patent application Ser. No. 13/264,453 (now U.S. Pat. No. 9,113,655), filed Oct. 14, 2011, which is a U.S. National Phase Application under 35 U.S.C. 371 of International Application PCT/US2010/031492, filed on Apr. 16, 2010, which claims priority to U.S. Provisional Application Ser. No. 61/170,090, filed on Apr. 16, 2009, the content of which are hereby incorporated by reference in their entireties.

TECHNICAL FIELD

The present disclosure provides, inter alia, compositions and processes related to the concentration of phenolics.

BACKGROUND

Many phenolics, e.g., plant derived phenolics (e.g., phenolics in fruits and vegetables), can be useful in food stuffs and/or as health products (e.g., dietary supplements), due to their well documented association with human health. Certain foods, for example, fruits such as cranberries, provide a rich source of phenolics. However, current methods for the recovery of plant derived phenolics are inefficient or yield undesirable mixtures of phenolics. Improved methods for the selective recovery and/or concentration of phenolics are desired. Such methods may allow novel opportunities in the field of health product development.

SUMMARY

Compositions and processes are provided for extracting, obtaining and/or concentrating (e.g., enriching) phenolics.

In some aspects, the present disclosure provides methods of extracting phenolics. These methods can include steps of obtaining a liquid feedstock. Useful liquid feedstocks can include any phenolics containing feedstock. In some embodiments, the liquid feedstock includes a juice obtained from one or more phenolics containing fruits, vegetables, legumes and the like. For example, liquid feedstock can include juice obtained from cranberries (e.g., cranberry juice). Cranberry juice can be obtained by any method that allows juice to be obtained from cranberries. In some instances, cranberry juice can be obtained by crushing cranberries and purifying the resulting cranberry juice. Methods suitable for use in such application are known in the art and include, but are not limited to, e.g., counter current extraction. Liquid feedstock can then be contacted with a material that retains, captures, or binds phenolics, and that does not substantially retain, capture, or bind sugars and organic acids. The duration of time and conditions under which the feedstock is contacted with such a material (e.g., a resin) can be modified such that at least a portion of the phenolics present in the liquid feedstock are retained, captured, or bound, without retaining, capturing, or binding at least sugars and organic acids. In some aspects, the liquid feedstock is contacted with a resin. Suitable resins include, but are not limited to, for example, resins with one or more of the following physical properties: a surface area of greater than or equal to about 300 $m^2/g$ (e.g., greater than 380 $m^2/g$ or equal to about 700 $m^2/g$), aliphatic ester resins, a moisture holding capacity of about 61% to about 69%, a porosity of greater than about 0.5 ml/ml. In some aspects, the resin can include AMBERLITE™ XAD-7HP resin. In some aspects the resin can include AMBERLITE™ FPX-66. The material contacted with the liquid feedstock (e.g., the resin) can then be washed using a solution that does not substantially reduce the amount of phenolics retained, captured, or bound therein. Useful wash solutions can include a solvent diluted in water to a concentration that does not substantially reduce the amount of phenolics retained, captured, or bound to the material (e.g., the resin). Exemplary solvents include, for example, ethanol at a concentration of about 5% by volume. The portion of phenolics retained, captured, or bound to the material (e.g., the resin) can then be obtained using a solution comprising a solvent, wherein the elution solution substantially decreases the amount of phenolics bound to the resin. Suitable elution solutions can include, but are not limited to, for example, about 95% ethanol by volume or about 90% acetone by volume. In some embodiments, the resulting phenolics can be obtained. Additional steps to remove any solvent present in the phenolics solution can optionally be performed, and/or the solution can be concentrated.

The phenolics containing solution resulting from the above described process is referred to herein as an extract. Such extracts can include phenolics at a second concentration, wherein the second concentration is greater than the first concentration and wherein the first concentration is the concentration of the phenolics present in the liquid feedstock. Further, the extract can include at least anthocyanins and proanthocyanidins (PACs) and one or more of the following: a ratio of anthocyanins to PACs of about 1:5; a PACs oligomeric profile that is substantially the same as the PACs oligomeric profile in cranberries; a ratio of PACs to total phenolics that is substantially the same as the ratio of PACs to total phenolics in cranberries; a ratio of PACs to anthocyanins that is not the same as the ratio of PACs to anthocyanins in cranberries; phenolics with an average molecular weight of less than 14,000 Daltons; less than about 5% organic acids; and/or less than about 5% sugars. Such extracts, if liquid, can be dried to thereby provide a dry extract.

In some aspects, the present disclosure provides methods of making a beverage suitable for ingestion by a subject (e.g., a human or non-human subject). Such methods can include obtaining phenolics using the process described above, and adding the resulting extract to a liquid suitable for ingestion by a human and/or non-human animal. Exemplary beverages can include, but are not limited to beverages that contain fruit juice or juices.

In some aspects, the present disclosure provides phenolics containing extracts. Such extracts can include at least anthocyanins and proanthocyanidins (PACs) and at least one of the following characteristics or properties: a ratio of anthocyanins to PACs of about 1:5; a PACs oligomeric profile that is substantially the same as the PACs oligomeric profile in cranberry juice or cranberries; a ratio of PACs to total phenolics that is substantially the same as the ratio of PACs to total phenolics in cranberry juice or cranberries; a ratio of PACs to anthocyanins that is not the same as the ratio of PACs to anthocyanins in cranberry juice or cranberries; phenolics with an average molecular weight of less than 14,000 Daltons; less than about 5% organic acids; and/or less than about 5% sugars. These extracts can be liquid, dry, or partially dry (e.g., dehydrated, lyophilized, or powdered), or gel extract.

In some aspects, the present disclosure provides compositions that include at least anthocyanins and proanthocyanidins (PACs) and at least one of the following characteristics or properties: a ratio of anthocyanins to PACs of about 1:5; a PACs oligomeric profile that is substantially the same as the PACs oligomeric profile in cranberry juice or cranberries; a ratio of PACs to total phenolics that is substantially the same as the ratio of PACs to total phenolics in cranberry juice or cranberries; a ratio of PACs to anthocyanins that is not the same as the ratio of PACs to anthocyanins in cranberry juice or cranberries; phenolics with an average molecular weight of less than 14,000 Daltons; less than about 5% organic acids; and/or less than about 5% sugars. These extracts can be liquid, dry, or partially dry (e.g., dehydrated, lyophilized, or powdered), or gel extract.

In some aspects, the present disclosure provides compositions that include fumaric acid (e.g., isolated or purified fumaric acid) and phenolics (e.g., isolated, purified, or enriched phenolics (e.g., PACs)). In some embodiments, the ratio of fumaric acid to phenolics (e.g., proanthocyanidins (PACs) within such compositions is between about 4000:1 to about 100:1. For example, the ratio can be about 135:1, or about 238:1. In some embodiments, these compositions can be present in a beverage. Such beverages can have a pH of between about pH 2.0 to about pH 3.49. In some embodiments, the pH of such beverages can be equal to or greater than pH 3.49. For example, the pH can be about pH 2.0 to about pH 4.1 (e.g., pH 3.7 or pH 4.1). In some embodiments, the beverage can be a beverage that includes apple juice or the beverage can be apple juice. In some aspects, compositions comprising isolated fumaric acid and isolated phenolics can include a ratio of fumaric acid to phenolics (e.g., PACs) of between about, e.g., 10:1-50:1, or about 14:1. Such compositions can also be presented in a beverage. In some instances, such beverages can have a pH of greater than or equal to about pH 3.5, and/or the beverage can contain orange juice. In some embodiments, the phenolics present in these compositions can include, e.g., at least anthocyanins and PACs, and one of the following of the following: a ratio of anthocyanins to PACs of about 1:5; a PACs oligomeric profile that is substantially the same as the PACs oligomeric profile in cranberry juice or cranberries; a ratio of PACs to total phenolics that is substantially the same as the ratio of PACs to total phenolics in cranberry juice or cranberries; a ratio of PACs to anthocyanins that is not the same as the ratio of PACs to anthocyanins in cranberry juice or cranberries; phenolics with an average molecular weight of less than 14,000 Daltons; less than about 5% organic acids; and/or less than about 5% sugars. Alternatively, or in addition, the phenolics can be obtained using the methods disclosed herein. In some embodiments, compositions that include fumaric acid (e.g., isolated or purified fumaric acid) and phenolics (e.g., isolated, purified, or enriched phenolics (e.g., PACs)) can be powdered or liquid. In some embodiments, compositions that include fumaric acid (e.g., isolated or purified fumaric acid) and phenolics (e.g., isolated, purified, or enriched phenolics (e.g., PACs)) can be in a container. In some embodiments, the composition comprises isolated fumaric acid and isolated phenolics, e.g. within a suitable container.

In some aspects, the disclosure provides beverages (e.g., beverages suitable for ingestion by a human or non-human animal (e.g., fruit juice beverages) that includes phenolics containing at least PACs, and fumaric acid. In such aspects the concentration of PACs can be between about $4.2 \times 10^{-4}$ mg/mL and $8.29 \times 10^{-3}$ mg/mL and the concentration of fumaric acid can be between about 0.01% (weight/volume (w/v)) and 0.15% (w/v). In some embodiments the concentration of PACs can be about $4.2 \times 10^{-3}$ mg/mL and the concentration of fumaric acid can be about 0.1% (w/v). In some instances, the pH of beverages containing such compositions can be between about pH 2.0 to about pH 3.49, or the beverage can be apple juice or a beverage comprising apple juice. In some embodiments, the phenolics in such beverages can include at least anthocyanins and proanthocyanidins (PACs) and at least one of the following: a ratio of anthocyanins to PACs of about 1:5; a PACs oligomeric profile that is substantially the same as the PACs oligomeric profile in cranberry juice or cranberries; a ratio of PACs to total phenolics that is substantially the same as the ratio of PACs to total phenolics in cranberry juice or cranberries; a ratio of PACs to anthocyanins that is not the same as the ratio of PACs to anthocyanins in cranberry juice or cranberries; phenolics with an average molecular weight of less than 14,000 Daltons; less than about 5% organic acids; and/or less than about 5% sugars, or the phenolics can be obtained using the methods disclosed herein.

In some aspects, such beverages can include a concentration of PACs of between about $4.2 \times 10^{-4}$ mg/mL and 0.1 mg/mL and a concentration of fumaric acid of between about 0.01% (weight/volume (w/v)) and 0.15% (w/v). For example, in some instances the concentration of PACs can be about $5 \times 10^{-2}$ mg/mL and the concentration of fumaric acid can be about 0.07% (w/v). In some instances, the pH of beverages containing such compositions can be greater than or equal to about pH 3.5 and/or the juice can be a beverage comprising orange juice.

In some aspects, the present disclosure provides methods of making compositions for reducing bacterial contamination (e.g., *Alicyclobacillus* (ACB) contamination) of a beverage. Such method can include obtaining isolated fumaric acid and isolated phenolics comprising PACs; and combining the isolated phenolics and fumaric acid to yield a ratio of fumaric acid to PACs of between about 4000:1 to about 100:1 when the composition is added to the beverage. In some embodiments, the ratio can be about 135:1 or about 238:1.

In some aspects, the present disclosure provides methods of making compositions for reducing bacterial contamination (e.g., *Alicyclobacillus* (ACB) contamination) of a beverage. Such methods can include obtaining isolated fumaric acid and isolated phenolics comprising PACs; and combining the isolated phenolics and fumaric acid to yield a ratio of fumaric acid to PACs of between about 10:1 to about 50:1. In some embodiments, the ratio can be about 14:1.

In some aspects, the present disclosure encompasses methods of making a beverages that include obtaining a beverage; and adding to the beverage phenolics comprising PACs and fumaric acid, wherein the final concentration of exogenously added PACs is between about $4.2 \times 10^{-4}$ mg/mL and $8.29 \times 10^{-3}$ mg/mL and the concentration of fumaric acid is between about 0.01% (weight/volume (w/v)) and 0.15% (w/v). In some embodiments, the concentration of PACs can be about $4.2 \times 10^{-3}$ mg/mL and the concentration of fumaric acid is about 0.1% (w/v), and/or the pH of the beverage can be between about pH 2.0 to about pH 3.49. In some embodiments, the beverage can be apple juice or a beverage comprising apple juice. In such embodiments, the concentration of exogenously added PACs can be about $4.2 \times 10^{-3}$ mg/mL and the concentration of fumaric acid can be 0.1% (w/v). In some embodiments, the phenolics included in such beverages can include at least anthocyanins and proanthocyanidins (PACs) and at least one of the following: a ratio of anthocyanins to PACs of about 1:5; a PACs oligomeric profile that is substantially the same as the PACs oligomeric profile in cranberry juice or cranberries; a ratio of PACs to total phenolics that is substantially the same as the ratio of PACs to total phenolics in cranberry juice or cranberries; a ratio of PACs to anthocyanins that is not the same as the ratio of PACs to anthocyanins in cranberry juice or cranberries; phenolics with an average molecular weight of less than 14,000 Daltons; less than about 5% organic acids; and/or less than about 5% sugars. In some embodiments, these methods can include adding to the beverage phenolics comprising PACs and fumaric acid, wherein the final concentration in the beverage of exogenously added PACs is between about $4.2 \times 10^{-4}$ mg/mL and 0.1 mg/mL and the concentration of fumaric acid is between about 0.01% (weight/volume (w/v)) and 0.15% (w/v). In some embodiments, the concentration of PACs can be about $5 \times 10^{-2}$ mg/mL and the concentration of fumaric acid can be about 0.07% (w/v), and/or the beverage can have a pH of greater than or equal to about pH 3.5, and/or the beverage can be orange juice or a beverage comprising orange juice. In some embodiments, the beverage is orange juice and the concentration of exogenously added PACs is about $5 \times 10^{-2}$ mg/mL and the concentration of fumaric acid is 0.07% (w/v).

Unless otherwise defined, all technical and scientific terms used herein have the same meaning as commonly understood by one of ordinary skill in the art to which this invention belongs. Methods and materials are described herein for use in the present invention; other suitable methods and materials known in the art can also be used. The materials, methods, and examples are illustrative only and not intended to be limiting. All publications, patent applications, patents, sequences, database entries, and other references mentioned herein are hereby incorporated by reference in their entirety. In case of conflict, the present specification, including definitions, will control.

Other features and advantages of the invention will be apparent from the following description and figures, and from the claims.

DETAILED DESCRIPTION

The present disclosure is based, at least in part, on the finding that phenolics can be extracted, obtained, and/or concentrated from a feedstock containing phenolics using the process disclosed herein. Furthermore, the present disclosure provides that these extracted phenolics can be used in the development of health products and food preservatives. Accordingly, the present disclosure provides, inter alia, processes that can be used to extract, obtain, and/or concentrate (e.g., enrich) phenolics (e.g., naturally occurring phenolics, e.g., plant phenolics) from feedstocks containing phenolics, and compositions (e.g., extracts) containing phenolics obtained using these processes (e.g., phenolics enriched extracts). Such compositions—which are termed herein as "phenolics," "enriched extracts" or simply "extracts"—can include, for example, at least anthocyanins and proanthocyanidins (PACs).

Processes

Figure 1:
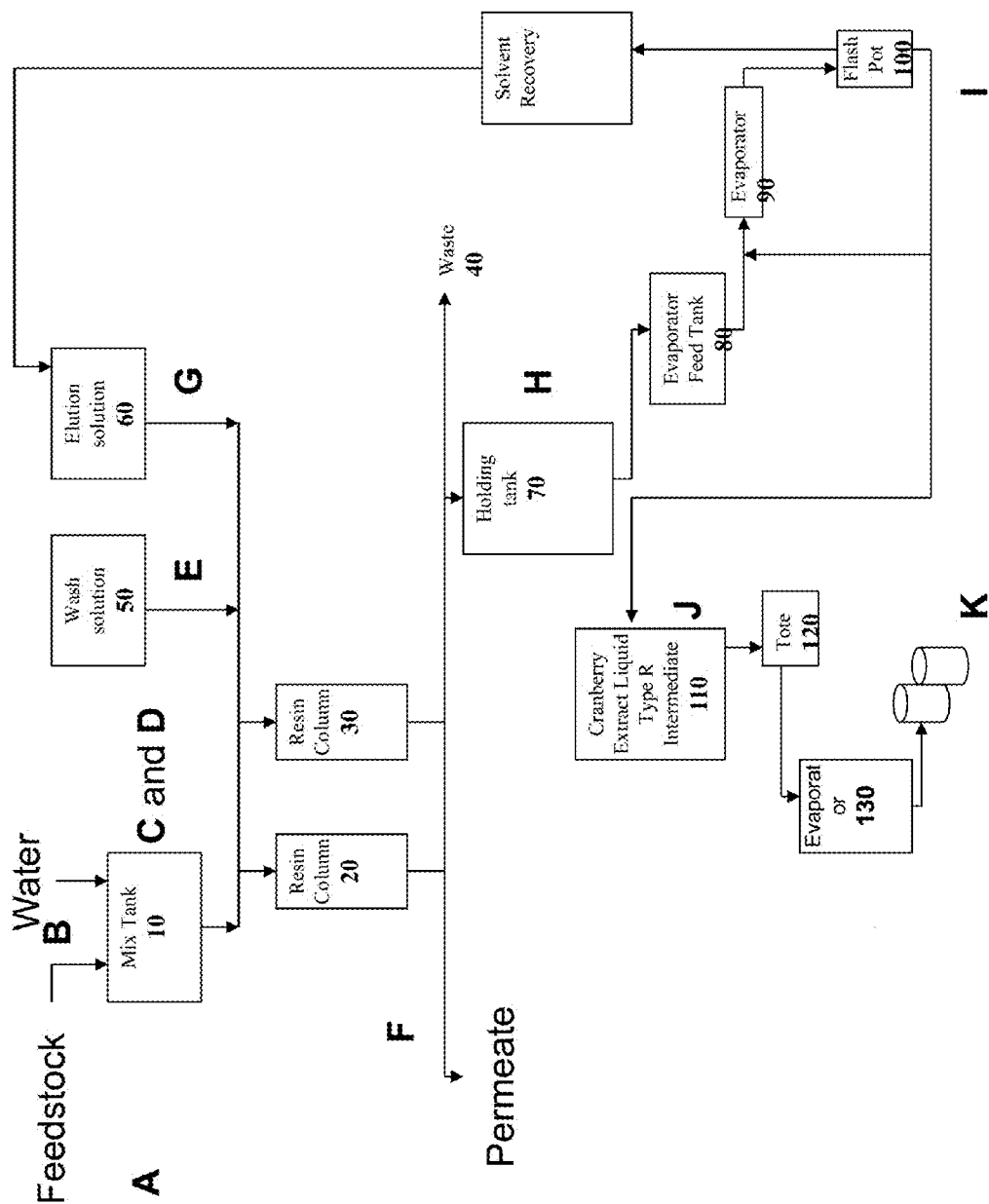
FIG. 1 is a flow diagram providing one embodiment of the process disclosed herein. A through K correspond to the Sample IDs shown in Table 7.

Referring to FIG. 1, a flow diagram is provided illustrating one exemplary embodiment of a process for extracting phenolics from a phenolics containing feedstock (e.g., cranberries or a solution obtained from cranberries). The process can use a feedstock that contains phenolics. This feedstock can be a solid or liquid. Solid feedstocks can be liquefied or solubilized and optionally filtered to generate a liquid feedstock prior to use in the disclosed process.

The process can begin with a phenolics containing liquid feedstock (e.g., cranberry juice obtained by countercurrent extraction (CCE), as described in U.S. Pat. Nos. 5,320,861 and 5,419,251). Liquid feedstocks can contain known amounts of solids per volume (e.g., about 5 pounds of solids per gallon or about 50 Brix). If required (e.g., to decrease or increase the concentration of the solids in the liquid), the liquid feedstock can be diluted (e.g., using water or reverse osmosis (RO) water) in "mix tank" 10 to yield a lower concentration of solids per volume (e.g., about 2.3 pounds of solids per gallon or about 25 Brix), or concentrated to yield a higher concentration of solids per volume (e.g., about 8.6 pounds of solids per gallon or about 75 Brix). The concentration of solids in the liquid feedstock can be modified to yield a viscosity, e.g., for allowing optimal passage or flow of the material through columns 20 and 30 (e.g., the concentration of solids can be about 0.01, 0.05, 0.1, 0.5, 1, 1.5, 2, 2.5, 3, 3.5, 4, 4.5, 5, 5.5, 6, 6.5, 7, 7.5, or about 8.6 pounds of solids per gallon). The liquid feedstock can be held in mix tank 10 prior to being fed to columns 20 and 30.

Prior to being contacted with the liquid feedstock, resin in columns 20 and 30 can be contacted with a volume of liquid (e.g., water or Reverse Osmosis (RO) water) sufficient to remove or dilute media (e.g., ethanol) used to store the resin. The liquid feedstock can then be fed from mix tank 10 to resin columns 20 and 30, wherein the resin is contacted by the liquid feedstock for a time and under conditions sufficient for phenolics (e.g., a portion of phenolics) present in the feedstock to bind to the resin (e.g. are captured or retained by the resin). Liquid exiting columns 20 and 30 is referred to as feedstock flow through. An initial volume of feedstock flow through can be discarded as waste or redirected for further processing. The remaining volume of feedstock flow through can be collected as reduced-phenolics containing permeate.

A volume of wash solution can then be fed from wash tank 50 to resin columns 20 and 30 to remove residual feedstock. All wash solution flow through can be collected as permeate.

A volume of elution solution containing a solvent can subsequently be fed from elution tank 60 to resin columns 20 and 30 to remove bound phenolics (e.g., a substantial portion of bound phenolics) from the resin. The entire volume, or a portion thereof, of elution solution flow through can be collected in holding vessel 70.

The above steps represent a single cycle of the exemplary process. This cycle can be repeated any number of times (e.g., 2, 3, 4, 5, 6, 7, 8, 9, 10, or more, times), as required to obtain a target volume of elution solution, in a single run. Repeat cycles can be batch type, semi-continuous, or continuous. Prior to additional cycles, the columns can be flushed. Alternatively, if further cycles are not required, resin in columns 20 and 30 can be submerged in ethanol for storage.

When required, e.g., once a sufficient volume of elution solution flow through has been collected in holding tank 70, the elution solution flow through can be fed to evaporator feed tank 80 and then cycled through to evaporator 90 and flash pot 100 (e.g., once or multiple times or as required to reduce the solvent content of the elution solution flow through to less than 90 parts per million using, e.g., evaporator 130), where much of the solvent is recovered by evaporation to yield a volume of solution containing a reduced amount of solvent and water and concentrated phenolics. The reduced solvent solution (i.e., the extract, i.e., the liquid extract containing, e.g., water and extracted phenolics) can be fed to tank 110 and/or tote 120.

In some instances, the liquid extract can optionally be dried, e.g., spray dried.

The above described steps constitute a single run of a single process.

The foregoing is a description of one embodiment of the process. Those skilled in the art will be able to modify the process and will appreciate that any number of variations are possible and within the present disclosure.

As noted above, the process disclosed herein can include one or more cycles encompassed by a single run. Runs can be repeated as required.

Feedstock that can be used in the foregoing process can include any naturally occurring and/or synthetic materials (e.g., solutions and liquids) containing phenolics (e.g., containing levels (e.g., naturally occurring levels) of at least anthocyanins and/or proanthocyanidins (e.g., type A proanthocyanidins)). Phenolics can include, for example, the art recognized class of compounds, which may also be known as phenols, and all compounds known in the art to be encompassed by this class of compounds. The phenolics class encompasses a diverse range of naturally occurring and synthetic compounds. The simplest of the phenolics is phenol, which contains a single hydroxyl group directly bonded to an aromatic group. Phenolics also include the polyphenols, which contain more than one phenol unit per molecule. The most commonly occurring polyphenols are classified as flavonoids. All flavonoids contain a nucleus consisting of two phenolic rings and an oxygenated heterocycle. Flavonoids are further categorized, based upon their oxidation state. Exemplary classes of flavonoids include flavonols, flavanols, catechins, flavanones, anthocyanidins, and isoflavonoids. Proanthocyanidins (PACs), or condensed tannins, are a form of flavanol that are composed of polymer chains of catechins (see e.g., Cheynier V., Am. J. Clin. Nutr., 81:223S-229S, 2005). PACs are reported to be formed through reactions of anthocyanins with compounds containing a polarizable double bond. Accordingly, PACs differ in the nature of their constitutive units, sequence, the positions of interflavanic linkages, chain length, and the presence of substituents (e.g., galloyl or glucosyl groups). PACs, including higher-molecular weight PACs, are generally soluble in aqueous media or hydroalcoholic media. PAC protein affinity and astringency correlates (e.g., increases) with the degree of PAC polymerization and galloylation. Specifically, higher-molecular weight PACs are more astringent than oligomeric PACs (Vidal et al., J. Sci. Food Agric., 83:564-573, 2003). Furthermore, PACs with a low degree of polymerization, e.g., a degree of polymerization of 2 to 4 (dimer to tetramer), i.e., oligomeric PACs, are highly bioactive. Exemplary lists of compounds encompassed by the class are publicly available and can be found, for example, on the World Wide Web (see, for example, World Wide Web address en.wikipedia.org/wiki/Category:Phenols (accessed on Nov. 27, 2009, and last modified on 23 Nov. 2009 at 14:07), in text books, and in published periodicals. The term phenolics includes those compounds encompassed by the phenols, polyphenols, flavonols, flavanols, catechins, flavanones, anthocyanidins, and isoflavonoids, and proanthocyanidins (PACs) chemical classes.

Phenolics containing feedstocks can include, but are not limited to, for example, fruits from plants of the genus *Vaccinium*, cranberries (e.g., juice, seeds, skin, pulp, and leaves), the juice, seeds, and skins of grapes, apples, fruit of locusts, cowberry fruit, bilberry, blueberry (and juice obtained therefrom), lingonberry, huckleberry, black current, chokeberry, black chokeberry, and pine bark, peanuts (e.g., peanut skins), ginkgo (e.g., ginkgo leaves), cola nuts, Rathania (e.g., Rathania roots), cinnamon, cocoa, black tea, and green tea. In some instances, feedstock can include, but is not limited to, (1) whole cranberries, (2) cranberry skins, (2) cranberry seeds, (3) cranberry pulp, (4) cranberry leaves, (5) whole cranberry plants, (6) and any combination of (1)-(6). In addition, materials other than the disclosed can be used in the processes disclosed herein if the material contains phenolics. Methods for identifying and quantifying phenolics in materials or feedstocks are known in the art and include, but are not limited to, for example, direct spectroscopy at 280 nm; indirect spectroscopy using, e.g., art recognized and commercially available reagents and assays, e.g., Vanillan assay, Folin-Denis assay, Folin-Ciocalteu assay, Prussian Blue assay, Bate-Smith assay, and Porter assay; and liquid chromatography, e.g., using ultraviolet, fluorescence, mass spectroscopy, and nuclear magnetic resonance (NMR). Phenolics detection techniques are also disclosed in the literature (see, e.g., Fereidoon and Naczk, Food Phenolics, Technomic Publishing Co. Inc, 1995).

Feedstock can be solid or liquid and fresh or frozen. Solid feedstocks can be liquefied or solubilized, e.g., put into solution, prior to commencing the process. Frozen feedstocks can be thawed, e.g., prior to use. Feedstock can also be used with or without modification. Exemplary useful modifications can include selection, refinement, and/or mechanical processing. For example, the materials can be cleaned to remove debris (e.g., material that does not contain PACs), e.g., debris, and/or sorted to select material of a defined size. When the material is fruit (e.g., cranberry), the material can be cut into slices, and/or skinned to expose the inner flesh of the fruit (e.g., the cranberry pulp) and to increase the surface area of the material. In some cases, skins and pulp can then be used together or can be separated and used separately.

Feedstock can also include juice (e.g., cranberry juice) produced by traditional pressing, enzymatic digestion, and/or by countercurrent extraction (CCE) (CCE is described in U.S. Pat. Nos. 5,320,861 and 5,419,251, which are hereby incorporated by reference in their entirety)), or juice as described in or as obtained using the methods described in U.S. Pat. Nos. 6,733,813; 6,977,092; and 7,022,368, each of which is hereby incorporated by reference in its entirety.

As used herein, juice refers, e.g., to the liquid expressed or extracted from one or more of the fruits or vegetables disclosed in the paragraphs above (e.g., cranberries) or a puree of the edible portions of a fruit or vegetable that is used as a beverage.

In some embodiments, feedstock is not an ultrafiltrate and/or is not pretreated using ultrafiltration, e.g., ultrafiltration, e.g., as disclosed in U.S. Publication No. 20090035432.

The volume of liquid feedstock used in the process (e.g., in a single cycle of the process) can be varied as required. For example, the volume of feedstock in a single cycle of the process can include from about 100 mL to about 10 gallons for small scale runs, and about 100 gallons to about 1000 gallons, and up to, e.g., 20,000 gallons for large scale runs.

In some instances, the volume and/or concentration of liquid feedstock used can be based upon the adsorbent capacity of the resin, which can be based on the volume of resin present in the column), such that the volume and/or concentration of liquid feedstock is optimized to not exceed the adsorbent capacity of the resin. For example, the volume of liquid feedstock can be, less than, equal to, or greater than the adsorbent capacity of the resin.

The volume of liquid feedstock can be increased or decreased to provide a chosen concentration of solids. In some instances, the volume of a first feedstock with a first concentration of solids can be increased or decreased to provide a second feedstock with more or less concentrated solids. In some instances, the concentration of solids in a liquid feedstock can be selected to provide a certain viscosity, e.g., such that the liquid feedstock allows certain flow rates. Exemplary concentrations of solids that can be present in a liquid feedstock include, but are not limited to, about 1-10%, 11-20%, 21-30%, 31-40%, 41-50%, over 50%, or 25% (the concentration of solids in a liquid feedstock can also be shown in terms of percent or Brix). Methods for increasing the volume of a liquid feedstock include, for example, adding a volume of a suitable solution (e.g., water) to the liquid feedstock, e.g., to increase the total volume of the liquid feedstock and thereby reduce the concentration of solids in the feedstock.

Methods for decreasing the volume of a liquid feedstock include, for example, reverse osmosis, or evaporation, or both, e.g., to decrease the total volume of the liquid feedstock and thereby increase the concentration of solids in the feedstock. In some instances, the volume of liquid feedstock can be about 346 gallons and the concentration of solids in the liquid feedstock can be about 50%, e.g., per column, per cycle. If required, the volume of the feedstock can be increased to provide a liquid feedstock containing about 25% solids prior to contacting the liquid feedstock with the resin, e.g., by adding an equal volume (e.g., about 346 gallons) of liquid (e.g., water) to the liquid feedstock.

In some embodiments, preparation of a feedstock for use in the processes disclosed herein does not include an extraction step, e.g., an acid or alkaline extraction step.

The size (e.g., volume or capacity or area (e.g., in $m^2$) within a single column) of a column for use in the above disclosed process can be varied according to the scale of the process. For example, a small scale process (e.g., a laboratory scale process) can use columns (e.g., one or more, e.g., 2, 3, 4, 5, 10, or 20) with a capacity from about 100 mL to about 10 gallons (e.g., 1 liter), and a large scale process (e.g., an industrial or commercial scale process) can use columns (e.g., one or more columns, e.g., 2, 3, 4, 5, 6, 7, 8, 9, 10, 20, or more than 20 columns) with a capacity from about 10 gallons to about 1000 gallons (e.g., about 141 gallons).

The volume of liquid (e.g., water) that can be used to remove or dilute media used to store resin in the resin columns can include any volume of liquid that is sufficient to completely replace the media or dilute the media by at least about 10% (e.g., at least about 20%, 50%, 80%, 90%, 95%, or 99%).

Resin suitable for use in the processes disclosed herein include, for example, a resin (e.g., a synthetic resin) that can bind phenolics present in a phenolics containing feedstock. Such resins can include, for example, resin with (1) a first binding affinity for, and that binds (e.g., that binds specifically) phenolics; and (2) a second binding affinity for organic acids and/or sugars, wherein the second binding affinity is lower than the first binding affinity, e.g., such that the resin does not bind (e.g., does not substantially bind), organic acids and/or sugars in a feedstock.

In some instances, the resin can (i) bind to non-polar to medium polarity phenolics, (ii) be styrene-based having one or more bromine substituents, (iii) be hydrophobic, be a non-ionic aliphatic acrylic polymer, (iv) provide a large binding surface area, (v) be an organic resin, (vi) be an ion-exchange resin, (vii) be an aromatic resin, (viii) be a (meth)acrylic acid resin, (ix) be a (meth)acrylate resin, (x) be a acrylonitrile aliphatic resin, and/or any combination of (i)-(x).

Examples of commercially available resins that can be used in the processes disclosed herein include, but are not limited to, SP207 Sepabeads™ (Mitsubishi Chemical), SP700 Sepabeads™ (Mitsubishi Chemical), Diaion HP20 (Mitsubishi Chemical), Diaion SP70 (Mitsubishi Chemical), Diaion SP825 (Mitsubishi Chemical), Diaion SP850 (Mitsubishi Chemical), Diaion HP2MG methacrylate (Mitsubishi Chemical), ADS-5 (Nankai University, Tianjin, China), ADS-17 (Nankai University, Tianjin, China), Amberlite™ XAD-4 (manufactured by Organo Co. and distributed globally by Rohm & Hass), Amberlite™ XAD-16 (manufactured by Organo Co. and distributed globally by Rohm & Hass), Amberlite™ XAD-1600 (manufactured by Organo Co. and distributed globally by Rohm & Hass), Amberlite™ XAD-2 (manufactured by Organo Co. and distributed globally by Rohm & Hass), Amberlite™ XAD-1180 (manufactured by Organo Co. and distributed globally by Rohm & Hass), Amberlite™ XAD-2000 (manufactured by Organo Co. and distributed globally by Rohm & Hass), Amberchrom™ CG300-C(Rohm & Hass), and any combination thereof. In some embodiments, the resin is not the commercially available C18 resin.

In some embodiments, the resin is commercially available Amberlite™ FPX66 (Rohm & Hass). FPX66 has the following properties: FPX66 consists of white beads that form a matrix consisting of a macroreticular aromatic polymer. The moisture holding capacity of the resin is 60-68% and its specific gravity is 1.015 to 1.025. The resin has a uniformity coefficient of less than or equal to 2.0, a harmonic mean size of 0.600-0.750 mm, a fine content of less than 0.300 mm, and a surface area of greater than or equal to 700 $m^2$/g. The porosity of the resin is 1.4 cc/g.

In some embodiments, the resin is commercially available Amberlite™ XAD-7HP resin (manufactured by Organo Co. and distributed globally by Rohm & Hass). Information on XAD-7HP can be found at the Rohm & Hass world wide web site amberlyst.com/xad7 hp_typical.htm. Specifically, XAD-7HP resin has the following properties: XAD-7HP is a macroreticular aliphatic crosslinked polymer ester resin that consists of white translucent beads that have a moisture holding capacity of 61-69%. The resin has an high surface area (e.g., approximately or about 300-500 $m^2$/g (e.g., greater than 380 $m^2$/g)), a specific gravity of 1.06 to 1.08, an average pore size of approximately 450 Angstroms, a mean diameter of approximately 560 μm, and both a continuous polymer phase and a continuous pore phase. The harmonic mean size of the beads is 0.56-0.71 mm with a uniformity coefficient of less than or equal to 2.0. The maximum operating temperature of the resin is 80-100° C. (i.e., 175-210° F.).

The amount of resin used can be varied and is dependent upon the scale of the process and/or the volume or capacity of the column.

The time and conditions sufficient for phenolics present in the feedstock to bind to the resin include those times and conditions under which at least and/or about 1% or 10% (e.g., at least and/or about 1%, 5%, 10%, 20%, 30%, 40%, 50%, 60%, 70%, 80%, 90%, 95%, 99% and 100%, or a range between any two of these values) of phenolics present in the liquid feedstock bind to the resin. Methods for assessing the percentage of phenolics present in the feedstock that have bound to the resin can include, for example, steps of first assessing the level of phenolics in the liquid feedstock, and then assessing the level of phenolics present in the feedstock flow through and/or the non-phenolics containing permeate, wherein any difference in the level of phenolics is an indication of the level of phenolics bound to the resin. Methods for detecting phenolics are known in the art and are exemplified above.

The time and conditions sufficient for phenolics present in the feedstock to bind to the resin can be controlled, e.g., by varying the flow rate of the feedstock into the resin (e.g., the time the feedstock is contacted with the resin), and/or the temperature within the resin column. For example the flow rate of the feedstock into the resin column can include, but is not limited to, about 1.0-6.0 gallons per minute (e.g., about 1.0, 1.5, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.5, 6.0 gallons per minute), and the temperature within the resin column can be selected to minimize microbial growth (e.g., 35° F.-80° F.).

As noted above, a volume of feedstock flow through can be discarded as waste or redirected for further processing. Exemplary volumes that can be discarded include at least and/or about, 0.5%, 1%, 5%, 10%, and about 20%.

Wash solutions useful in the processes disclosed herein can include, for example, water based solutions containing one or more solvents that will not reduce (e.g., substantially reduce) the amount of phenolics bound to the resin. Exemplary wash solutions can include water or water mixed with one or more solvents, for example, water containing up to about 25% solvent (e.g., up to and/or about 25%, 20%, 15%, 10%, 5%, 4%, 3%, 2%, 1%, 0.5%, and/or below 0.5% solvent). Suitable solvents include, but are not limited to, e.g., alcohol (e.g., methanol, ethanol, propanol), acetone, hexane, and/or mixtures thereof.

In some instances, the wash solution is a water based solution containing 5%±1% total ethanol (e.g., 1 part ethanol in 19 parts water). The volume of wash solution can be adapted to the volume or capacity of the resin-containing column, wherein one-times the volume of resin in the column is referred to as one bed volume. For example, the volume of wash solution can include, e.g., less than one bed volume, about one bed volume, about two bed volumes, or more than two bed volumes.

In some instances, the volume of wash solution can be about 282 gallons or about 2 bed volumes and the wash solution can include about 5%±1% total ethanol (e.g., 1 part ethanol in 19 parts water).

In some instances, the volume of wash solution can be about 282 gallons or about 2 bed volumes and the wash solution can include about 5%±1% Standard Denatured Alcohol (SDA), e.g., SDA 35A 190, in water (further information regarding SDA 35A 190 can be found at world wide web address sasoltechdata.com/tds/sda35A_190. pdf).

A single cycle can include 1 or more wash steps (e.g., 1, 2, 3, 4, 5, or more wash steps) per each cycle. Furthermore, the wash steps can be performed for a time and under conditions that allow optimal removal of non-phenolics from the resin. For example the flow rate of the wash solution into the resin column can include, but is not limited to, 1.0-6.0 gallons per minute (e.g., about 1.0, 1.5, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.5, 6.0 gallons per minute), and the temperature within the resin column can be selected to minimize microbial growth (e.g., 35° F.-80° F.).

Elution solutions that can be used in the processes disclosed herein can include water based solutions containing one or more solvents at any concentration that will decrease (e.g., substantially decrease) the association between resin-bound phenolics and resin, such that phenolics are released from the resin. Exemplary elution solutions can include solvent or a mixture of solvent and water (e.g., wherein the concentration of the solvent is about 100%, or less than 100%, e.g., about 99%, 98%, 97%, 96%, 95%, 90%, 85%, 80%, 75%, 70%, 60%, 55%). Suitable solvents can include, but are not limited to, e.g., alcohol (e.g., methanol, ethanol, propanol), acetone, and hexane. In some instances, the elution solution is a water based solution containing 95%±1% total ethanol. The volume of elution solution can include, e.g., less than one bed volume, about one bed volume, about two bed volumes, or more than two bed volumes.

In some instances, the volume of elution solution can be about 346 gallons or about 2.8 bed volumes and the elution solution can include 95% total ethanol in water.

In some instances, the volume of elution solution can be about 346 gallons or about 2.8 bed volumes and the elution solution can include 95% Standard Denatured Alcohol (SDA), e.g., SDA 35A 190, in water.

A single cycle can include 1 or more elution steps (e.g., 1, 2, 3, 4, 5, or more elution steps) per each cycle. Furthermore, the elution steps can be performed for a time and under conditions that allow optimal removal of phenolics from the resin. For example the flow rate of the wash solution into the resin column can include, but is not limited to, 1.0-6.0 gallons per minute (e.g., about 1.0, 1.5, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.5, 6.0 gallons per minute), and the temperature within the resin column can be selected to minimize microbial growth (e.g., 35° F.-80° F.).

In some embodiments, elution flow through is collected without further processing. In other embodiments, elution flow through is further processed. For example, phenolics containing solutions can be evaporated using at least one evaporation step (e.g., 1, 2, 3, 4, 5, or more evaporation steps), e.g., to reduce the amount of solvent present in the solution, resulting in a solution containing phenolics, water, and a reduced amount of solvent as compared to the elution solution. In some instances, the evaporation step can be repeated to further reduce the amount of solvent present in the solution. Evaporation methods can include, but are not limited to, e.g., batch evaporation methods and continuous evaporation methods, falling film methods, rising film methods, falling plus rising film methods (e.g., using plates and tubes), multiple effects methods, single effects methods, and vapor recompression.

In some instances, the evaporation step can be repeated, e.g., until the amount of solvent in the solution is less than about 90 parts per million. Evaporation methods can include, for example, the use of temperature (e.g., heat) and/or pressure (e.g., vacuum) sufficient to reduce the amount of solvent in solution. Exemplary conditions can include a temperature of at least about 70° C. (e.g., about 71° C., 72° C., 73° C., 74° C., 75° C., 76° C., 77° C., 78° C., 79° C., 80° C., 81° C., 82° C., 83° C., 84° C., 85° C., 86° C., 87° C., 88° C., 89° C., 90° C. and above 90° C. (or the Fahrenheit equivalent)) and pressure of at least about 50 mBar (e.g., 50 mBar, 60 mBar, 70 mBar, 80 mBar, 90 mBar and above 90 mBar). In some embodiments, evaporation conditions can be about 124° F. and about 130 mBar. Other exemplary evaporation conditions include combinations of temperature and vacuum shown in Table 1.

TABLE 1

Exemplary Evaporation Conditions

| Temperature (° F.) | Vacuum (mBar) |
|---|---|
| 104 | 73.77 |
| 114 | 98.61 |

TABLE 1-continued

Exemplary Evaporation Conditions

| Temperature (° F.) | Vacuum (mBar) |
|---|---|
| 124 | 130.35 |
| 134 | 170.46 |
| 144 | 220.67 |
| 154 | 282.93 |
| 164 | 359.48 |
| 174 | 452.8 |
| 184 | 565.72 |
| 194 | 701.24 |
| 204 | 862.9 |
| 212 | 2605.4 |

In some instances, an evaporation step can be carried out in conjunction with a step to reduce the concentration of solids in the liquid (e.g., a dilution step).

In some embodiments, evaporation can include (i) removing solvent from the phenolics containing solutions and (ii) concentrating the phenolics containing solutions. In some instances, (i) and (ii) are performed simultaneously using e.g., a rotary evaporator (Rotovap). Alternatively, (i) can be performed using, e.g., distillation columns and (ii) can be performed either simultaneously or subsequently. Other exemplary methods for removing solvent include, but are not limited to, the use of temperature and/or vacuum as described above using, e.g., a rotary evaporator (Rotovap).

In some embodiments, evaporation can include (i) removing solvent from the phenolics containing solution using distillation columns and (ii) concentrating the phenolics containing solutions using a rising film plate evaporator. Alternatively or in addition, evaporation can include the use of forced circulation evaporators, or Pfaudler kettles.

The solution resulting from the evaporation step is a liquid (e.g., water) containing phenolics (a liquid extract). This extract does not comprise fruit juice, e.g., fruit juice expressed or extracted from a feedstock disclosed above in the absence of the process disclosed herein; or fruit juice produced by traditional pressing, enzymatic digestion, or by CCE; or juice as described in or as obtained using the methods described in U.S. Pat. Nos. 6,733,813; 6,977,092; and 7,022,368. In some instances, the liquid extract can be obtained and optionally analyzed, e.g., to assess the level of phenolics and/or to characterize the types of phenolics present.

The liquid extract can be concentrated, e.g., to increase the concentration of solids in the extract. Concentration methods include, but are not limited to, e.g., one or more of, membrane concentration, heat concentration, vacuum (reduced pressure) concentration, and freeze concentration. In some instances, this liquid extract can be obtained and optionally analyzed, e.g., to assess the level of phenolics and/or to characterize the types of phenolics present.

Liquid extracts can be dried to provide a dry extract containing phenolics. Methods for drying the liquid extracts can include, but are not limited to, for example, freeze drying, vacuum drying, spray drying, drum drying, shelf drying, and drying by microwave.

If required, a liquid or dry extract can be analyzed, e.g., to assess the level of phenolics present and/or to characterize the phenolics present (e.g., to determine the relative amounts of phenolics (e.g., anthocyanins and PACs) present in the extract.

Extracts can also be optionally sterilized. Sterilization can be performed by a method commonly used by those skilled in the art, such as high-pressure sterilization, heat sterilization, filter sterilization, and microwave sterilization.

Extracts

The extracts (e.g., phenolics enriched extracts) obtained using the processes disclosed herein can be liquid, dry, semi dry, or powdered extracts (e.g., powdered, dehydrated, or lyophilized extracts) containing at least anthocyanins and proanthocyanidins (PACs). Such extracts can be additionally characterized as having or containing a total amount of anthocyanins of at least about 1% (weight to volume (w/v), weight to weight (w/w), or volume to volume (v/v)), as assessed (e.g., quantified) using HPLC. For example, extracts can contain at least about or about 1%, e.g., at least about 2%, 3%, 4%, 5%, 6%, 7%, 8%, 9%, 10%, 11%, 12%, 13%, 14%, 15%, 16%, 17%, 18%, 19%, 20% (w/v, w/w, or v/v), or at least about 21% (w/v, w/w, or v/v), or a range between any two of these values, anthocyanins, as assessed by HPLC. Such extracts can also contain at least about 10% (w/v, w/w, or v/v) PACs, as assessed (e.g., quantified) using, e.g., HPLC. For example, extracts can contain at least about or about 10%, 15%, 20%, 25%, 30%, 35%, 40%, 45%, 50%, 55%, 60% (w/v, w/w, or v/v), more than 61%, 65%, 70%, 75%, or at least about 80% (w/v, w/w, or v/v), or a range between any two of these values, PACs, as assessed by HPLC.

The levels of PACs in an extract can be assessed or quantified using DMAC (the DMAC method is disclosed in Cunningham et al., Analysis and Standardization of Cranberry Products, Quality Management of Nutraceuticals, ACS Symposium Series, 803ed., American Chemical Society, Washington D.C., pages 151-166, 2002, which is hereby incorporated by reference). In such instances, extracts containing at least anthocyanins and proanthocyanidins (PACs) can contain about or at least about 40% (w/v, w/w, or v/v) PACs, as assessed (e.g., quantified) using, e.g., DMAC. For example, extracts can contain at least about or about 40%, 50%, 55%, 60%, 70%, 80% (w/v, w/w, or v/v), more than 80% (w/v, w/w, or v/v), or a range between any two of these values PACs, as assessed by DMAC; and/or a ratio of anthocyanins to PACs of about 1:5 (e.g., about 1:2, 1:2.5, 1:3, 1:3.5, 1:4, 1.4.5, 1:5, 1:5.5, 1:6, 1.6.5, 1:7, 1:7.5, 1:8, 1:8.5, 1:9, 1:9.5, or about 1:10), wherein anthocyanins are assessed (e.g., quantified) using, e.g., HPLC, and PACS are assessed (e.g., quantified) using, e.g., HPLC or DMAC; and/or a PACs oligomeric profile that substantially the same or similar, (e.g., substantially similar) to the PACs oligomeric profile present in CCE cranberry juice feedstock. Alternatively or in addition, the PACs oligomeric profile can include higher amounts of 2-mer and greater than 10-mers than other PACs oligomers. Alternatively or in addition, the PACs oligomeric profile can include ratios of PACs oligomers of about 6(1mer):28(2mer):11(3mer):8(4mer):6(5mer):7(6mer):3(7mer):4(8mer):2(9mer):26(>10 mer); and/or a ratio of PACs to total phenolics that is substantially the same (e.g., roughly equal) to the ratio of PACs to total phenolics present in cranberries or the fruit from which the phenolics were extracted, e.g., present in cranberries or counter current extracted cranberry juice; and/or a ratio of PACs to quercetin, quercgalac, quercitrin, myricetin, and/or quercaraban that is the same (e.g., substantially the same) or similar, (e.g., substantially similar) to the ratio of PACs to quercetin, quercgalac, quercitrin, myricetin, and/or quercaraban present in CCE cranberry juice; and/or a ratio of PACs to total anthocyanins that is not the same as the ratio of PACs to total anthocyanins in cranberries or the fruit from which the phenolics were extracted, e.g., present in cranberries or counter current extracted cranberry juice; and/or.

phenolics (e.g., polymeric phenolics) with a molecular weight (e.g., an average molecular weight) of less than 14,000 Daltons; and/or PACs (e.g., 10% or more of total PACs in the extract) with polymer chain lengths of 1, 2, 3, 4, 5, 6, 7, 8, 9, 10, or greater than 10, or combinations thereof; and/or a higher concentration of anthocyanin and PACs than is present in cranberries or the fruit from which the phenolics were extracted, e.g., present in cranberries or counter current extracted cranberry juice feedstock, e.g., a higher dry weight concentration.

Extracts containing at least anthocyanins and proanthocyanidins (PACs) can be optionally further characterized based on the levels of organic acids (e.g. total organic acids) and sugars (e.g., total sugars) in the extract. For example, extracts can contain less than 5% (w/v, w/w, or v/v) organic acids (e.g., about 5% or less than about 5%, 4%, 3%, 2%, 1% organic acids, less than 1% organic acids, no organic acids (e.g., the extract can be free (e.g., substantially free) of organic acids), or a range between any two of these values), and/or less than 5% sugar (e.g., about 5% or less than about 5%, 4%, 3%, 2%, 1% sugar, less than 1% sugar, no sugar (e.g., the extract can be free (e.g., substantially free) of sugar), or a range between any two of these values).

The phenolics extracted using the process described herein can be soluble in aqueous media.

An extract can be formulated as a composition for use in an animal (e.g., a human and/or non-human animal), e.g., for ingestion or consumption by an animal (e.g., a human and/or non-human animal). Such compositions can include excipients, e.g., to increase the stability, solubility, shelf-life, taste, to standardize the level of a particular compound in the composition, and/or bioabsorption of the extract. Examples of includable excipients include but are not limited to, calcium carbonate, calcium phosphate, various sugars and types of starch, cellulose derivatives, gelatin, vegetable oils, polyethylene glycols, propylene glycol, and inhibitors of enzymes that degrade and/or modify phenolics, such as inhibitors of polyphenoloxidases, peroxidases, glycosidases, decarboxylases, and esterases. Alternatively or in addition, the extracts can be combined with agents that protect them from oxidative reactions (e.g., anti-oxidants). Different diafiltration media (e.g., acidified water) can be employed to stabilize and/or adjust the color of the extract.

Use of Extracts

In some embodiments, the extracts disclosed herein can be used in or as nutriceuticals and/or as food supplements. For example, the extracts can be formulated as powders, pills, tablets, capsules or syrups for administration to an individual (e.g., a human or non-human) by any route, e.g., by ingestion. Alternatively or in addition, the extracts can be used to supplement a food or beverage to enhance the health benefits conferred by the food or beverage. For example, such an extract could be applied to (e.g., coated onto or infused into) fruits, vegetable, legumes, and the like (e.g., dried cranberries) to create a food product with enhanced health benefits. Alternatively or in addition, extracts can be used to supplement beverages, e.g., juice beverages including, but not limited to, e.g., fruit juices and fruit juice drinks (e.g., cranberry juice cocktails and juice blends), tea (e.g., herbal and non-herbal tea), leaf tea, yogurt, milk, smoothies, chewing gum, dietary supplements, water, flavored waters, energy drinks, and milk (e.g., liquid and powdered milk).

Compositions Comprising Phenolics and Fumaric Acid and Uses Thereof

Species of the genus *Alicyclobacillus* (ACB) include, for example, acidophilic, thermophilic, and spore forming bacteria such as *Alicyclobacillus acidoterrestris* and *Alicyclobacillus acidocaldarius*. ACB contamination of juice beverages can cause spoilage due to the production of guaiacol, an organic compound that imparts an unpleasant flavor and odor.

ACB contamination of juice beverages can be caused by the presence of soil residue in the juice beverage. Accordingly, careful washing of fruit with uncontaminated water during processing can reduce ACB contamination. Some fruits, however, are difficult to wash thoroughly. Such methods are also inefficient and can not be applied to previously processed and packaged juice beverages (e.g., packaged juice). ACB contamination can also be present in raw or refined sugar added to juices. Once ACB is present in a production line it can be difficult to eliminate because ACB spores are heat resistant. Pasteurization cannot always be used to eliminate ACB because the high temperatures required to eliminate ACB spores can be detrimental to juice quality. Certain types of filtration and irradiation can also be used to eliminate ACB, but such methods are not suitable for all products. High concentrations of phenolics can reduce ACB contamination in beverages such as fruit juice. The application of such methods are limited, however, because the level of phenolics required to cause an undesirable change in the color of the beverage. Fumaric acid alone can also reduce ACB contamination in juice beverages, but not without undesirably altering the taste of the juice.

Provided herein are compositions comprising (e.g., comprising, consisting essentially of, or consisting of) phenolics (e.g., concentrated, isolated, or purified phenolics (e.g., the extracts disclosed herein)) and fumaric acid. These compositions can be added to juice beverages that are susceptible to microbial (e.g., bacterial contamination or ACB contamination), to reduce or prevent microbial (e.g., bacterial contamination or ACB contamination) contamination therein.

Juice beverages susceptible to ACB contamination include, but are not limited to, for example, juice beverages contaminated with soil, juice beverages contaminated with raw or refined sugar containing ACB or ACB spores, and juice beverages containing ACB spores. Alternatively, the compositions can be added to juice beverages to reduce or prevent ACB contamination in ACB contaminated juices, e.g., juices containing viable ACB microbes. As ACB contamination reduces the shelf-life of juice beverages, the compositions described herein can be used to increase the shelf-life of juice beverages, or as juice beverages preservatives. Furthermore, such results can be achieved without undesirably altering the taste or appearance of the juice beverage due to the synergistic activity between the two components. As used herein, "synergy" or "synergistic activity" and the like refer to a combined effect of two components that is greater than the individual effects of the same components alone or when added together. For example, as used herein, synergy refers to a level of reduction in ACB contamination of a juice beverage, a reduction in ACB growth, or an increase in the death of ACB in the presence of fumaric acid and phenolics that is not observed in the presence of fumaric acid or phenolics alone.

In some embodiments, the compositions and methods disclosed herein prevent or reduce ACB growth, kill quiescent or dividing ACB cells, and/or eliminate ACB spores.

In some embodiments, compositions comprising ratios of phenolics to fumaric acid can include ratios of phenolics (e.g., PACs) to fumaric acid that are useful in higher acidity juice beverages. Exemplary higher acidity juice beverages can include, but are not limited to, apple juice (e.g., about pH 2.9-3.3 or about pH 2.9-4.1, e.g., pH 3.7), lemon juice (e.g., about pH 2.3), cranberry juice (e.g., about pH 2.3-2.5), tropical fruit blends, grapefruit juice (e.g., about pH 2.9-3.5), pineapple juice (e.g., about pH 3.4), grape juice (e.g., about pH 2.8-3.3), and juice blends containing two or more of these juices alone or in combination with low pH juice beverages. In some embodiments, higher acidity juice beverages have a pH of between about pH 2-pH 3.49.

In some embodiments, compositions comprising ratios of phenolics to fumaric acid can include ratios of phenolics (e.g., PACs) to fumaric acid that are useful in lower pH (e.g., lower acidity) juice beverages. Exemplary low pH juice beverages can include, but are not limited to, for example, orange juice (e.g., about pH 3.5-4.2, pH 3.9, or pH 4.6) and/or vegetable juice (e.g., about pH 3.9-4.3). In some embodiments, lower pH juices have a pH of greater (i.e., more alkaline) than about pH 3.5.

Useful ratios of fumaric acid to phenolics (e.g., PACs) can include, but are not limited to, e.g., ratios of fumaric acid to PACs of between about 4000:1-100:1, 3571:1-121:1, about 135:1, or about 238:1. In some instances, such ratios can be useful in higher acidity juice beverages.

Other useful ratios of fumaric acid to phenolics (e.g., PACs) for use in high pH juice beverages can include, but are not limited to, e.g., ratios of fumaric acid to PACs of between about 10:1-50:1, or 14:1. In some instances, such ratios can be useful in lower pH juice beverages.

In some instances, phenolics and fumaric acid can be present in a juice beverage at synergistic concentrations. With respect to fumaric acid, such concentrations can be defined using any art recognized units (e.g., percent weight/volume (e.g., g/100 mL) or percent volume/volume). Concentrations of phenolics can also be defined using any art recognized term (e.g., percent weight/volume (e.g., g/100 mL) or percent volume/volume) and can be expressed either as total phenolics or by specific phenolics (e.g., proanthocyanidins (PACs)). In some embodiments, phenolics can be extracts obtained using the processes disclosed herein and the amount of PACs in the extract can be about 55%.

In some embodiments, concentrations of added phenolics and fumaric acid in a beverage can include, e.g., $4.2 \times 10^{-4}$ mg/mL PACs (i.e., 0.1 mg PACs/8 oz)—$8.291 \times 10^{-3}$ mg/mL PACs (i.e., 1.99 mg PACs/8 oz), $2.1 \times 10^{-3}$ mg/mL PACs—$8.3 \times 10^{-3}$ mg/mL PACs, $2.1 \times 10^{-3}$ mg/mL PACs—$6.3 \times 10^{-3}$ mg/mL PACs, or about $4.2 \times 10^{-3}$ mg/mL PACs (i.e., 1 mg PACs/8 oz), and between about 0.01% (e.g., 0.001%-0.05%) to about 0.15% (e.g., about 0.10%-0.2%) fumaric acid, or about 0.1% fumaric acid by weight (e.g., w/w if the extract and fumaric acid are dry, v/w, or vice-versa, if one of the extract or liquid is dry).

In other embodiments, concentrations of added phenolics and fumaric acid in a beverage can be, e.g., $4.2 \times 10^{-4}$ mg/mL PACs (i.e., 0.1 mg PACs/8 oz)—100 mg/mL PACs, $4.2 \times 10^{-4}$ mg/mL PACs—80 mg/mL PACs, $4.2 \times 10^{-4}$ mg/mL PACs—60 mg/mL PACs, $4.2 \times 10^{-4}$ mg/mL PACs—40 mg/mL PACs, $4.2 \times 10^{-4}$ mg/mL PACs—20 mg/mL PACs, $4.2 \times 10^{-4}$ mg/mL PACs—10 mg/mL PACs, $4.2 \times 10^{-4}$ mg/mL PACs—5 mg/mL PACs, $4.2 \times 10^{-4}$ mg/mL PACs—1 mg/mL PACs, $4.2 \times 10^{-4}$ mg/mL PACs—0.5 mg/mL PACs, $4.2 \times 10^{-4}$ mg/mL PACs—0.1 mg/mL PACs, $4.2 \times 10^{-4}$ mg/mL PACs—0.05 mg/mL PACs, $4.2 \times 10^{-4}$ mg/mL PACs—0.04 mg/mL PACs, $4.2 \times 10^{-4}$ mg/mL PACs—0.03 mg/mL PACs, $4.2 \times 10^{-4}$ mg/mL PACs—0.02 mg/mL PACs, $4.2 \times 10^{-4}$ mg/mL PACs—0.01 mg/mL PACs, $4.2 \times 10^{-4}$ mg/mL PACs—0.005 mg/mL PACs, $4.2 \times 10^{-4}$ mg/mL PACs—0.001 mg/mL PACs, or 0.05 mg/mL PACs (i.e., 12 mg PACs/8 oz), and between about 0.01% (e.g., 0.001%-0.05%) to about 0.15% (e.g., about 0.10%-0.2%) fumaric acid, or about 0.1% fumaric acid by weight (e.g., w/w if the extract and fumaric acid are dry, v/w, or vice-versa, if one of the extract or liquid is dry).

In some embodiments, concentrations of phenolics and fumaric acid can include, but are not limited to, for example, no more than about 0.04 mg/ml PACs, or no more than about 1 mg/ml PACs, or about 0.04 mg/ml to about 0.17 mg/ml (e.g., 0.15 mg/ml-0.19 mg/ml) PACs, and about 0.01% (e.g., 0.001%-0.05%) to about 0.15% (e.g., about 0.10%-0.2%) fumaric acid by weight.

In some embodiments, compositions comprising phenolics and fumaric acid (e.g., dry phenolics and fumaric acid) can be prepared in amounts that are sufficient to yield synergistic concentrations of phenolics and fumaric acid when added to a volume of juice beverage. Such compositions can be prepared according to any of the above ratios alone or in amounts sufficient to provide a synergistic concentration of phenolics and fumaric acid when the composition is added to a defined volume of a juice beverage. Such compositions are within the present invention. Exemplary volumes of juice beverage to which such compositions can be prepared and/or added include, but are not limited to, 0.1, 0.5, 1, 10, 20, 50, 100, 200, 250, 300, 330, and 500 mLs, 1, 2, 2.5, 5, 10, 15, 20, 30, 50, 100, 150, 200, 250, 500, 750, 1000, 10,000, 25,000, 50,000, 100,000, 500,000, 1000,000 L, and above 1000,000 L (or the equivalent volumes in ounces and gallons), or a range between any two of the afore-listed integers.

Methods of Making Compositions Comprising Phenolics and Fumaric Acid

Compositions comprising phenolics and fumaric acid can include concentrated, purified, or isolated phenolics that include at least PACs, wherein the phenolics are concentrated and/or isolated from any phenolics containing feedstock, e.g., any phenolics containing feedstock disclosed herein. Methods for concentrating and/or isolating phenolics are known in the art and include, but are not limited to, for example, filtration. and those methods disclosed in, for example, U.S. Pat. Nos. 5,840,322, 6,440,471, 6,210,681, 5,650,432, 5,646,178, 5,474,774, 5,525,341, 6,720,353, and 6,608,102.

In some embodiments, phenolics are the extracts disclosed here or are obtained using the processes disclosed herein.

In some embodiments, extracts for use in or as food preservatives contain about 90% PACs (e.g., type A PACs).

Fumaric acid, as included in the compositions disclosed herein, can include any commercially available fumaric acid and the salts and esters thereof (e.g., fumarates). Fumaric acid is also referred to in the art as trans-butenedioic acid, has the chemical formula $HO_2CCH\!=\!CHCO_2H$, and has a molecular mass of 116.07 g/mol. Compositions comprising phenolics and fumaric acid can be prepared using any combination of liquid or dry phenolics and fumaric acid. Similarly, compositions comprising phenolics and fumaric acid can themselves be liquid or dry (e.g., spray dried). In some embodiments, compositions comprising phenolics and fumaric acid are dry (e.g., spray dried). In some embodiments, compositions comprising phenolics and fumaric acid can include isolated phenolics and isolated acid. Such compositions can also consist of or consist essentially of isolated phenolics and isolated fumaric acid. The compositions can be contained in any suitable container, vessel or vial suitable for storing or distributing the composition and/or adding the composition to a juice beverage. For example, compositions can be disposed within a container in amounts sufficient to yield synergistic concentrations of phenolics and fumaric acid when the composition is added to a liquid volume of juice beverage. Exemplary suitable containers include, but are not limited plastic, glass, metal, and paper vessels suitable for single use or multiple use. In some embodiments, containers can be marked or labeled to illustrate either the amount of the composition contained therein or that volume of juice beverage to which the composition should be added, e.g., to yield a synergistic concentration of phenolics and fumaric acid. For example, a container containing sufficient levels or amounts of phenolics and fumaric acid to provide synergistic concentrations of phenolics and fumaric acid in 1 L of juice beverage can be marked or labeled "1 L."

EXAMPLES

The invention is further described in the following examples, which do not limit the scope of the invention described in the claims.

Example 1

Extract Characterization (Small Scale Extraction)

Extract obtained using small scale (laboratory scale) processes was characterized to determine the types of phenolics present and the relative amounts of the different phenolics present (i.e., the relative amounts of one type of phenolic to another type of phenolic). Non-phenolic material was also assessed.

Briefly, feedstock (i.e., counter current extraction (CCE) cranberry juice) was concentrated using reverse osmosis to increase the Brix content from 1 Brix (the concentration obtained following CCE) to 18 Brix and evaporation to further increase the Brix content from 18 Brix to 50 Brix. The 50 Brix CCE feedstock was then diluted in water to 25 Brix. Diluted feedstock was contacted with Amberlite™ XAD-7HP resin. Flow through was collected as reduced-phenolics permeate. Resin was washed using 5% SDA ethanol wash solution. Flow through was collected as wash solution flow through. Bound phenolics were then eluted using 95% SDA ethanol elution solution. Elution solution flow through was collected and concentrated using evaporation (heat and vacuum) to produce a liquid extract containing 25% solids. Extract was then spray dried using a NIRO mobile minor spray drier Volumes used in the above small scale process are shown in Table 2.

TABLE 2

Volumes Used in Single Cycle of Small Scale Process

|  | Small (Laboratory) Scale (mL unless shown) |
|---|---|
| Column Volume | 1 L |
| Volume of Resin in Column | 943 |
| Volume of feedstock (50 Brix) | 2452 |
| Volume of Feedstock (25 Brix) | 4904 |
| Volume of feedstock not collected as feedstock flowthrough | 709 |
| Volume of reduced-phenolics feedstock flow through | 4195 |
| Volume of Wash Solution | 2000 |
| Volume of Elution Solution | 2452 |
| Flow rate (all steps) | 15.6 mL/minute |
| Re-equilibration volume | 2678 |

Distinct extracts from multiple small scale single cycle runs were analyzed to determine the levels of phenolics, organic acids, and sugars. Data from each run was combined and means calculated. The results of these experiments are shown in Table 3.

TABLE 3

Extract Characterization

|  | Av. (%) | Min. (%) | Max. (%) | Std. Dev. |
|---|---|---|---|---|
| % Solids | 95.52 | 95.18 | 97.25 | 0.97 |
| Quinic | 0.07 | 0.03 | 0.12 | 0.05 |
| Malic | 0.17 | 0.11 | 0.25 | 0.07 |
| Citric | 0.26 | 0.11 | 0.38 | 0.11 |
| Total Organic Acids | 0.50 | 0.39 | 0.76 | 0.17 |
| PACs[2] | 55.00 | 55.00 | 55.00 | 0.00 |
| PACs[1] | 18.20 | 18.20 | 18.20 | 0.00 |
| Phenolics (Folin) | 44.40 | 35.49 | 55.44 | 8.50 |
| Anthocyanins[1] | 6.86 | 4.94 | 9.78 | 2.24 |
| Dextrose | 0.17 | 0.00 | 0.67 | 0.33 |
| Fructose | 0.00 | 0.00 | 0.00 | 0.00 |
| Sucrose | 0.00 | 0.00 | 0.00 | 0.00 |
| Total Sugars | 0.17 | 0.00 | 0.67 | 0.33 |
| Quercetin | 0.54 | 0.17 | 1.22 | 0.59 |
| Quercitrin | 3.03 | 0.95 | 4.23 | 1.81 |
| Hyperoside | 2.24 | 0.93 | 4.71 | 2.14 |
| Myricetin | 0.24 | 0.09 | 0.52 | 0.24 |
| Rutin | 0.00 | 0.00 | 0.00 | 0.00 |
| Kaempferol | 0.00 | 0.00 | 0.00 | 0.00 |
| Isorhamnetin | 0.00 | 0.00 | 0.00 | 0.00 |
| Isoquercitrin | 0.00 | 0.00 | 0.00 | 0.00 |
| Total Flavonols | 6.05 | 5.17 | 7.06 | 0.95 |
| Standardizing carrier | 20.58 | 9.50 | 32.10 | 12.57 |
| Flow Agent | 0.80 | 0.80 | 0.80 | 0.00 |
| Total Recovery | 121.44 | 101.18 | 144.77 |  |

[1]Assessed by HPLC
[2]Assessed by DMAC
1 and 2 are normalized values

As shown in Table 3, the primary component of extract is phenolics (see "Phenolics (Folin)" in Table 3) with PACs and anthocyanidins present at the highest levels. Levels of flavanols quercetin, quercitrin, hyperoside, and myricetin were also detected.

In contrast, extract is substantially free of sugars (see "Total Sugars" in Table 3) and organic acids. Moreover, total organic acid content was less than 1% and total sugar content was less than 1%. These observations indicate that the process disclosed herein can be used to obtain extract from a CCE cranberry juice feedstock that contains high amounts of PACs and anthocyanins and that is substantially free of organic acids and sugars. Furthermore, the low standard deviation values shown confirm that between batch variation is low, or that the levels shown in Table 3 can be consistently obtained.

As noted above, PACs include molecules of various chain lengths. Experiments were performed to determine the chain lengths of PACs present in Extract. Experiments were also performed to determine the chain lengths of PACs present in multiple CCE feedstock samples used to obtain extract to allow comparison of PACs profiles in feedstock and extract. The results are shown in Table 4.

TABLE 4

PACs Oligomeric Content of Extract (gPAC Oligomers/100 g PACs)

| Sample ID | 1mers (%) | 2mers (%) | 3mers (%) | 4mers (%) | 5mers (%) | 6mers (%) | 7mers (%) | 8mers (%) | 9mers (%) | 10mers (%) | >10mers (%) | total % |
|---|---|---|---|---|---|---|---|---|---|---|---|---|
| CCE 1 | 6.87 | 25.31 | 10.35 | 6.10 | 4.27 | 5.11 | 1.46 | 1.59 | 2.39 | 0.00 | 36.55 | 100.00 |
| CCE 2 | 5.11 | 30.86 | 11.52 | 9.13 | 6.67 | 8.12 | 3.40 | 3.23 | 1.81 | 0.00 | 20.14 | 100.00 |
| CCE 3 | 7.02 | 29.39 | 9.98 | 7.14 | 5.13 | 6.11 | 3.25 | 3.88 | 2.81 | 0.00 | 25.28 | 100.00 |
| CCE 4 | 6.27 | 26.22 | 10.08 | 7.89 | 5.82 | 7.06 | 4.01 | 4.03 | 2.70 | 0.00 | 25.92 | 100.00 |
| CCE 5 | 5.52 | 28.95 | 11.38 | 8.40 | 6.19 | 7.53 | 3.99 | 4.15 | 2.75 | 0.00 | 21.15 | 100.00 |
| Mean | 6.2 | 28.15 | 10.66 | 7.73 | 5.62 | 6.79 | 3.22 | 3.4 | 2.49 | 0 | 25.8 | |
| Extract | 6.35 | 28.23 | 10.71 | 8.08 | 5.56 | 7.06 | 4.00 | 4.21 | 1.93 | 0.00 | 23.87 | 100.00 |

As shown in Table 4, the PACs profile in extract is substantially similar to the PACs profiles detected in multiple CCE feedstock samples. This observation suggests that the processes disclosed herein can be used to obtains PACs at levels present in a CCE feedstock. More specifically, 2mer and >10mer PACs are most prevalent in both extract and CCE feedstock. Levels of other PACs oligomers are also preserved in extract as compared to CCE feedstock. As revealed by these experiments, the ratios of PACs oligomers in both extract and CCE feedstock is about 6(1mer):28(2mer):11(3mer):8(4mer):6(5mer):7(6mer):3(7mer):4(8mer):2(9mer):26(>10 mer). Therefore, the processes disclosed herein can be used to obtain an abstract containing anthocyanins and PACs, wherein PACs oligomers are present at levels present in the feedstock.

Experiments were next performed to assess the levels of PACs to other phenolics, including anthocyanins and total phenolics, in extract and feedstock. These experiments were performed to allow determination of whether the ratios of PACs to other phenolics present in feedstock are preserved in extract. The results of these experiments are shown in Tables 5 and 6.

TABLE 5

Ratios of PACs and Phenolics in CCE Feedstock and Extract

| | Sample ID | | | | | | | |
|---|---|---|---|---|---|---|---|---|
| | 1 | | 2 | | 3 | | 4 | |
| Sample Type | CCE | Extract | CCE | Extract | CCE | Extract | CCE | Extract |
| Total PACs (%)- dry weight | 2.6 | 97.9 | 1.6 | 77.6 | 1.8 | 81.1 | 1.9 | 85.2 |
| Total Phenolics (%)- dry weight | 2.2 | 62.5 | 1.6 | 52.6 | 1.8 | 56.1 | 1.7 | 58.5 |
| PACs:total Phenolics | 1.3 | 1.6 | 1.2 | 1.5 | 1.1 | 1.4 | 1.3 | 1.4 |
| PACs:total anothocyanin (TAcy) | 5.7 | 14.0 | 4.9 | 11.2 | 5.3 | 13.2 | 6.7 | 16.3 |
| Total sugars- dry weight | 64.1 | 0.0 | 70.3 | 0.0 | 69.2 | 0.0 | 66.5 | 0.0 |
| Total organic acids- dry weight | 40.5 | 0.3 | 48.3 | 0.3 | 44.5 | 0.3 | 42.9 | 0.3 |
| PACs (ppm)/Quercetin (ppm): | 279.7 | 207.2 | 231.4 | 191.6 | 215.7 | 194.1 | 43.5 | 51.1 |
| PACs (ppm)/QuercGalac (ppm): | 39.1 | 22.3 | 21.9 | 13.0 | 18.8 | 15.3 | 28.3 | 24.4 |
| PACs (ppm)/Quercitrin (ppm): | 152.8 | 99.2 | 92.3 | 75.3 | 99.6 | 93.5 | 96.9 | 97.5 |
| PACs (ppm)/Myricetin (ppm): | 187.6 | 170.3 | 221.2 | 183.1 | 144.7 | 148.7 | 36.3 | 38.8 |
| PACs (ppm)/QuercAraban (ppm): | 108.3 | 76.8 | 85.7 | 74.8 | 64.1 | 64.1 | 74.7 | 75.1 |
| Total Solids (%) | 55.4 | 95.7 | 58.4 | 96.0 | 54.7 | 97.1 | 56.3 | 97.9 |

TABLE 6

Average Ratios of PACs and Phenolics in CCE Feedstock and Extract

| | Average ratios | |
|---|---|---|
| | CCE | Extract |
| PACs:Phenolics | 1.2 | 1.5 |
| PACs:total anthocyanins (TAcy) | 5.65 | 13.7 |

TABLE 6-continued

Average Ratios of PACs and Phenolics in CCE Feedstock and Extract

| | Average ratios | |
|---|---|---|
| | CCE | Extract |
| PACs:Quercetin | 192.6 | 161 |
| PACs:Quercetin galactoside (QuercGalac) | 27.0 | 18.8 |
| PACs:Quercitrin | 110.4 | 91.4 |
| PACs:Myricetin | 147.5 | 135.2 |
| PACs:Quercetin arabanoside (QuercAraban) | 83.2 | 72.7 |

As shown in Table 5, the levels of total PACs and total phenolics are increased in extract as compared to CCE feedstock. This observation confirms that the processes disclosed herein can be used to concentrate phenolics. Table 5 also presents data confirming that the levels of sugars and organic acids are reduced in extract as compared to CCE feedstock. This observation validates the data shown in Table 3, that extract contains reduced amounts of sugars and organic acids, and confirms that the processes disclosed herein can be used to separate phenolic compounds from sugars and acids and obtain a phenolics extract.

As shown in Tables 5 and 6, the ratio of PACs to total phenolics present in feedstock is preserved in extract. Similarly, the ratio of PACs to quercetin, quercgalac, quercitrin, myricetin, and quercaraban present in feedstock are also preserved in extract. In contrast, although anthocyanins are present in extract, the ratio of PACs to anthocyanins present in feedstock is not preserved in extract (see PACs:TAcy).

Therefore, the data presented herein demonstrate that the processes disclosed herein can be used to obtain an extract containing anthocyanins and PACs, wherein PACs oligomers are present at levels present in the feedstock, and wherein the ratio of PACs to total phenolics and PACs to PACs to quercetin, quercgalac, quercitrin, myricetin, and quercaraban in extract are the same as the ratios for the same phenolics in feedstock.

Example 2

Process Optimization

Certain steps or materials used in the process described in Example 1 were substituted in an attempt to further optimize the process. Briefly, the process described in Example 1 was repeated with the following modifications: (1) the wash step was performed using water instead of using 5% ethanol; (2) the wash step and elution step were performed using acetone; (3) the Amberlite™ XAD-7HP resin was substituted for FPX-66 resin and the wash step was performed using water instead of using 5% ethanol; (5) the Amberlite™ XAD-7HP resin was substituted for FPX-66 resin; and (6) the Amberlite™ XAD-7HP resin was substituted for FPX-66 resin and the wash step and elution step were performed using acetone. The yield of phenolics extracted, extract purity, and extract stability were then assessed. The results are shown in Table 7.

As shown in Table 6, both XAD-7HP and FPX-66 resin yielded high levels of PACs and total phenolics. Overall, however, XAD-7HP provided higher results than FPX-66, including haze stability. In contrast, FPX-66 provided slightly better results for color stability. Additionally, all wash and elution conditions tested provided good results. Acetone was observed to be the best wash and elution solution for PAC and phenolics recovery and purity.

These results suggest that while the process described in Example 1 is effective for obtaining extract containing anthocyanins and PACs, wherein PACs oligomers are present at levels present in the feedstock, and wherein the ratio of PACs to total phenolics and PACs to PACs to quercetin, quercgalac, quercitrin, myricetin, and quercaraban in extract are the same as the ratios for the same phenolics in feedstock; the process may be modified using the changes shown here without compromising efficiency.

Example 3

Comparison of Small Scale and Large Scale Extractions

Experiments were performed to confirm that the process described in Example 1 can be performed on a large scale (i.e., a commercial scale) and that extracts obtained using large scale process represent those extracts described in Example 1.

The volumes of materials used in a single cycle of a large scale process are shown in Table 7.

TABLE 7

Process Optimization

| | Modification # (see text in Ex. 3) | | | | | |
|---|---|---|---|---|---|---|
| | 1 | 2 | 3 | 4 | 5 | 6 |
| Resin | XAD-7HP | XAD-7HP | XAD-7HP | FPX-66 | FPX-66 | FPX-66 |
| Wash | Water | 5% EtOH | 5% acetone | Water | 5% EtOH | 5% acetone |
| Elution | 90% EtOH | 90% EtOH | 90% acetone | 90% EtOH | 90% EtOH | 90% acetone |
| Yield Data | | | | | | |
| PAC Yield (% of feed-Av) | 92.59 | 97.57 | 101.44 | 86.32 | 88.43 | 96.76 |
| Phenolic Yield (folin-Av) | 77.98 | 77.78 | 79.35 | 67.45 | 80.37 | 84.55 |
| Purity Data | | | | | | |
| PACs (% dwb-Av) | 51.49 | 64.40 | 71.02 | 41.66 | 42.96 | 44.76 |
| Phenolics (Folin-Av) | 48.68 | 51.34 | 51.88 | 36.55 | 38.83 | 41.32 |
| Phenolics (Folin-Bruns) | 47.55 | 61.86 | 67.70 | 32.74 | 38.43 | 39.72 |
| Phenolics (HPLC-OS) | 93.97 | 155.63 | 108.32 | 81.56 | 88.12 | 87.45 |
| Acys (ppm-OS) | 65056 | 83085 | 46977 | 58855 | 66269 | 50301 |
| Quercetin (ppm-OS) | 4120 | Not done | Not done | 3180 | 3300 | 3140 |
| ORAC (Bruns) | 8131 | 9701 | 10379 | 6756 | 7410 | 6633 |
| Beverage Stability | | | | | | |
| Bev Haze Slope v. time | 2.87 | 1.52 | 1.93 | 2.44 | 2.14 | 2.68 |
| Bev Color Slope v. time | −3.27 | −4.66 | −3.35 | −3.50 | −1.92 | −2.65 |

TABLE 7

Volumes Used in Single Cycle of Small Scale Process

| | Large (Commercial) Scale (gallons unless shown) |
|---|---|
| Column Volume | 141 |
| Volume of Resin in Column | 133 |
| Volume of feedstock (50 Brix) | 346 |
| Volume of Feedstock (25 Brix) | 692 |
| Volume of feedstock not collected as feedstock flowthrough | 100 |
| Volume of reduced-phenolics feedstock flow through | 592 |
| Volume of Wash Solution | 282 |
| Volume of Elution Solution | 346 |
| Flow rate (all steps) | 2.2 gallons/minute |
| Re-equilibration volume | 378 |

Extracts obtained using a small scale process were then compared to extract obtained using large scale process.

Briefly, a small scale process was performed using cranberry CCE as described in Example 1 using the volumes shown in Table 2 and a large scale process was performed using the process described in Example 1 with the volumes shown in Table 7.

A schematic representation of the above process is provided in FIG. 1. FIG. 1 includes points at which certain samples were taken. The required characteristics of each of the samples shown in FIG. 1 are detailed in Table 9.

Extracts resulting from small scale and large scale extractions were then analyzed and compared. The results of these studies are shown in Table 8.

TABLE 8

Comparison of Extracts Obtained Using Large Scale and Small Scale Extraction

| | Sample ID | | | | | | | |
|---|---|---|---|---|---|---|---|---|
| | Large Scale | Small Scale 1 | Small Scale 2 | Small Scale 3 | Small Scale 4 | Small Scale 5 | Small Scale 6 | Small Scale 7 | Small Scale 8 |
| Solids (%) | 97.25 | 96.15 | 97.44 | 97.2 | 96.45 | 95.72 | 96.02 | 97.13 | 97.85 |
| Total organic acids (%) | 0.85 | 0.42 | 0.80 | 0.61 | 0.62 | 0.26 | 0.31 | 0.27 | 0.31 |
| Total Sugars (%) | 0.75 | 0.00 | 0.00 | 0.00 | 0.00 | 0.00 | 0.00 | 0.00 | 0.00 |
| PACs (DMAC) | 61.61 | 91.26 | 67.98 | 82.89 | 80.44 | 97.86 | 77.60 | 81.13 | 85.17 |
| Anthocyanins (HPLC) | 10.96 | 6.59 | 7.12 | 7.94 | 7.18 | 6.71 | 6.66 | 5.99 | 5.12 |
| Total Phenolics (Folin) | 51.39 | 54.79 | 47.58 | 51.98 | 57.54 | 58.73 | 55.02 | 5.99 | 5.12 |

As shown in Table 8, the results reported in Example 2 and Table 4, obtained using small scale processes were reproducible in multiple small scale processes and an commercial scale extraction.

These results suggest that extract containing anthocyanins and PACs, wherein PACs oligomers are present at levels present in the feedstock, and wherein the ratio of PACs to total phenolics and PACs to PACs to quercetin, quercgalac, quercitrin, myricetin, and quercaraban in extract are substantially the same as the ratios for the same phenolics in feedstock can be obtained using large scale processes.

TABLE 9

Sample Characteristics of Extraction Process

| Sample ID | Description | Analysis | Specification |
|---|---|---|---|
| A | CCE 1 | Haze | |
| | | Total plate count (TPC) | <1000/g |
| | | Yeast | <100/g |
| | | Mould | <100/g |
| B | Reverse Osmosis water | TPC | <1000/g |
| | | Yeast | <100/g |
| | | mould | <100/g |
| C | CCE 2 | % Solids | Read and record (RR) (%) |
| | | ° Brix | RR (%) |
| | | Specific gravity | RR (g/mL) |
| D | Liquid feedstock for feeding to resin column | % Solids | 25 ± 1% |
| | | PACs | ≥1.5% dwb |
| | | Phenolics | RR (% dwb) |
| | | % titratable acidity | RR (%) |
| | | Haze | RR (NTU) |
| | | Anthocyanins | RR (ppm) |
| | | TPC | <1000/g |
| | | Yeast | <100/g |
| | | Mould | <100/g |
| E | Wash solution | % Etoh | 5 ± 1% (v/v) |
| F | Phenolics free permeate | ° Brix | ≥2 |
| G | Elution solution | % water | ≤20&% by Karl Fisher |
| H | Feedstock flow through | % solids | RR (%) |
| | | PACs | RR (% dwb) |
| | | TPC | <1000/g |
| | | Yeast | <100/g |
| | | Mould | <100/g |
| I | Evaporated extract 1 | % Solids | 25 ± 2% |
| | | % Etoh | RR (%) |
| J | Evaporated extract 2 | % Solids | 25 ± 2% |
| | | % Etoh | RR (%) |
| K | Liquid extract | % Solids | 25 ± 2% |
| | | Etoh | <90 ppm |
| | | PACs | ≥56% dwb |

TABLE 9-continued

Sample Characteristics of Extraction Process

| Sample ID | Description | Analysis | Specification |
|---|---|---|---|
| | | Phenolics | R (% dwb) |
| | | Anthocyanins | RR (% dwb) |
| | | Appearance | Deep red/purple liquid |
| | | Aroma | Cranberry aroma |
| | | TPC | <1000/g |
| | | Yeast | <100/g |
| | | Mould | <100/g |

Example 4

Use of Extracts in Food Preservation

Experiments were performed to determine whether the combination of extract obtained using the processes disclosed herein and fumaric acid can be used to reduce spoilage.

Briefly, various juices were inoculated with approximately 100 spores of a mixture of the ACB strains listed in Table 10. Spores were then harvested from PDA (Potato Dextrose Agar) plates and heat inactivated.

TABLE 10

| ID | Source (origin) |
|---|---|
| | ACB Strains Used |
| 230 | Hassia apple juice |
| 231 | NFPA (National Food Processors Association) |
| 233 | Hassia apple juice |
| 245 | Craving-less sugar Tropical |
| 247 | Peach juice |
| 250 | Pink grapefruit 100% juice |

Extract suitable for use in the methods disclosed in this Example can be obtained using any convenient technique and from any suitable feedstock. In this case, extract was obtained from cranberries, which are a particularly rich source of PACs, using the processes disclosed herein. Briefly, cranberry juice at 25 Brix was loaded on a Rohm & Haas XAD-7HP resin column. The column was washed with a solution containing 5% ethanol/95% water to elute sugars, acids and other unwanted components. Extract was eluted by washing the column using a solution containing 90% ethanol and 10% water. Eluate was concentrated by evaporation to 25% solids, then spray dried into a powder. The PAC level in the powder ranged from 55 to 85% by weight.

PAC concentration was assessed for the experiments in this Example as follows. Briefly, a sample to be analyzed was applied to a Sephadex LH-20 column. The column was then washed with distilled water and then 25% ethanol/75% water. These washes elute sugars, organic acids, anthocyanins and monomeric phenolic compounds. The PACs were then eluted by washing the column with 70% acetone in 30% water. The eluate is allowed to react with a solution of 0.1% dimethylaminocinnamaldehyde (DMAC) in 30% hydrochlonic acid in 70% methanol. DMAC can act as an electrophile condensing with aromatic rings in an acidic media and is highly specific for flavanols. When a prepared DMAC reagent is added to a solution containing PACs an aldehyde condensation reaction occurs with the terminal monomer of a polymeric proanthocyanidins at the eight carbon position of the flavanoid A-ring. The resulting colored adducts have a maximum absorption of 640 nm. A standard curve of absorbance at 640 nm was developed using solutions of known contents of purified cranberry PACs.

Sample juices were supplemented with either cranberry juice, extract, fumaric acid, or both, in the presence and absence of about 100 ACB spores/ml, as shown in Table 11. Sample juices were then stored at 43° C. Aliquots of juice were removed periodically and tested for ACB by subculturing onto PDA plates. Sensory testing was also performed by a panel of 2-4 people trained to detect the presence of guaiacol. The tests were performed at several intervals during a 1 month period. Negative controls (non-inoculated juice) were included in the tests and tested at the same time as the inoculated product.

TABLE 11

Food Preservation Results

| Sample juice | Extract Mg PAC/8 oz | % Fumaric acid (wt/wt) | % Cranberry juice | pH | Brix | TA (%) | Micro (Growth) | Sensory |
|---|---|---|---|---|---|---|---|---|
| CranPomBlue | 0 | 0 | 7.33 | 3.56 | 12.52 | 0.45 | + | + |
| CranPomBlue | 40 | 0 | 7.33 | 3.5 | 10.54 | 0.48 | − | − |
| Tropical Citrus | 0 | 0.14 | 0 | 3.43 | 13.35 | 0.46 | + | + |
| Tropical Citrus | 40 | 0.14 | 0 | 3.4 | 13.4 | 0.46 | − | − |
| Tropical Citrus | 30 | 0.14 | 0 | 3.41 | 13.13 | 0.46 | − | − |
| Tropical Citrus | 20 | 0.14 | 0 | 3.41 | 13.18 | 0.46 | − | − |
| Tropical Citrus | 10 | 0.14 | 0 | 3.42 | 13.21 | 0.46 | − | − |
| Extract water beverage | 40 | 0 | 0 | 2.67 | 2.74 | 0.17 | − | − |
| Tropical with Ruby Red | 5 | 0.14 | | | | | + | |
| Tropical with Ruby Red | 7.5 | 0.14 | | | | | − | |
| Tropical with Ruby Red | 9.5 | 0.14 | | | | | − | |
| Tropical with Ruby Red | 10 | 0.14 | | | | | − | |
| Tropical with Ruby Red | 10.5 | 0.14 | | | | | − | |

Microbiological results [+] = microbial growth; [−] no growth detected.
Sensory results [+] = off-flavors, typical of the presence of guaiacol; [−] no off-flavors.

As shown in Table 11, the combination of extract and fumaric acid to juices prevented ACB growth and guaiacol production. Similar results were observed with apple juice and orange juice.

These observations support that the combination of extract and fumaric acid results in a synergistic effect at some concentrations. Specifically, the reduction in contamination promoted by the combination of extract and fumaric acid is greater than the additive effect of the components. This synergism was further evaluated in the following example.

Example 5

Minimum Inhibitory Concentration of Compositions Comprising Extract and Fumaric Acid The ability of the compositions described in Example 4 (i.e., compositions comprising extract and fumaric acid) to inhibit ACB growth were evaluated over a range of different concentrations to establish the minimum inhibitory concentration (MIC) of the composition.

Extract was obtained using the processes described herein and contained 55% PACs as determined using DMAC. Fumaric acid was obtained from a commercial vendor (Tate and Lyle, IL, lot number FT7C2301B4).

Apple juice was inoculated with spores from a mixture of ACB strains (eight strains of A. acidoterrestris and one ACB strain obtained from apple juice). These spores were suspended in phosphate buffered saline (PBS) and heat shocked at 76° C. for 10 minutes. Spore concentration was determined using a hemocytometer under phase contrast microscopy. Juices were inoculated with 1000 spores/mL. Inoculated samples were incubated for 48 hours and were then cultured on acidified potato dextrose agar (PDA+TA) at 43° C. for 72 hours. Colony forming units were then counted. The ratios of extract to fumaric acid used in these experiments are shown in Table 12.

TABLE 12

| | Ratio of Extract to Fumaric Acid | | | | |
|---|---|---|---|---|---|
| | Extract (mg PAC/8 oz) | | | | |
| Fumaric acid (%) | 0 | 1.0 | 2.0 | 3.0 | 4.0 |
| 0 | 0/0 | 1/0 | 2/0 | 3/0 | 4/0 |
| 0.05 | 0/0.05 | 1/0.05 | 2/0.05 | 3/0.05 | 4/0.05 |
| 0.10 | 0/0.10 | 1/01.0 | 2/0.10 | 3/0.10 | 4/0.10 |
| 0.15 | 0/0.15 | 1/01.5 | 2/0.15 | 3/0.15 | 4/0.15 |
| 0.20 | 0/0.20 | 1/0.20 | 2/0.20 | 3/0.20 | 4/0.20 |

Data was plotted in the format of a isobologram. Such graphs are useful in assessing synergy. Specifically, two compounds that result in an additive effect yield a straight line. Deviation to the left of this line indicates that the combination of two compounds is synergistic, while deviation to the right of the line indicates that the combination of the two compounds is antagonistic (Vigil et. al., Methods for activity assay and evaluation of results, Antimicrobials in Food, 3$^{rd}$ Edition, CRC Press, Edited by Davidson, Sofos, and Branen, 2005).

Figure 2:
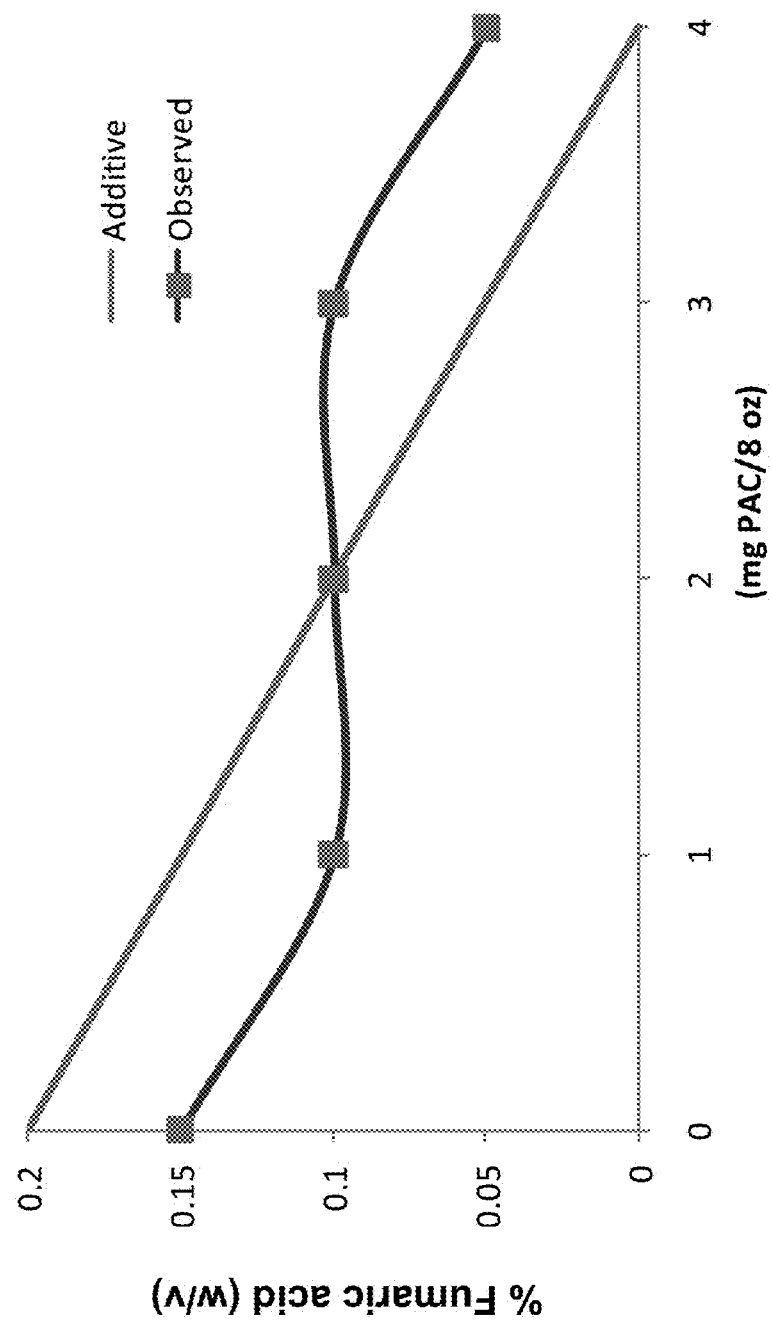
FIG. 2 is a line graph showing the growth of *Alicyclobacillus* species in the presence of concentrations of extract and fumaric acid.

As shown in FIG. 2, compositions comprising extract and fumaric acid inhibited ACB growth at a range of concentrations. Specifically, ACB growth was inhibited at concentrations of 0.1% fumaric acid and 0.01 mg PAC/8 oz. Furthermore, FIG. 2 shows a clear synergistic effect at concentrations of between 0.15%-0.1% fumaric acid and 0.01-1.99 mg PAC/8 oz. As noted above, the results shown in FIG. 2 represent experiments performed using apple juice.

Example 6

Log Reduction Experiments

Inhibition of ACB growth by compositions comprising extract and fumaric acid was confirmed in 100% apple juice (Ocean Spray—see FIG. 3) and 100% orange juice (Ocean Spray—see FIG. 4). Compositions tested for each juice type are shown in Table 13.

TABLE 13

| | Ratio of Extract to Fumaric Acid | | | |
|---|---|---|---|---|
| | Extract (mg PAC/8 oz) | | | |
| | Apple juice | | Orange juice | |
| Fumaric acid (%) | 0.0 | 2.5 | 0.0 | 12.0 |
| 0.0 | 0.0/0.0 | 2.5/0.0 | 0.0/0.0 | 12.0/0.0 |
| 0.07 | — | — | 0.0/0.07 | 12/0.07 |
| 0.14 | 0.0/0.14 | 2.5/0.14 | — | — |

Apple juice was inoculated with nine strains of ACB (eight strains of A. acidoterrestris and one ACB strain obtained from apple juice) and orange juice was inoculated with four strains of A. acidoterrestris. Spores were heat shocked and enumerated as described in Example 5. Juice samples were then inoculated with 500 spores and incubated at 43° C. for 48 hours (apple) or 72 hours (orange) before being plated on PDA+TA. Plates were incubated at 43° C. and CFU for 72 hours. CFU were quantified as described in Example 5. CFU counts were log transformed and analyzed by analysis of variance (ANOVA) followed by Fisher's LSD multiple comparison test. Log reductions were calculated for fumaric acid and extract alone and in combination. Results are shown in FIGS. 3 and 4.

Figures 3A, 3B:
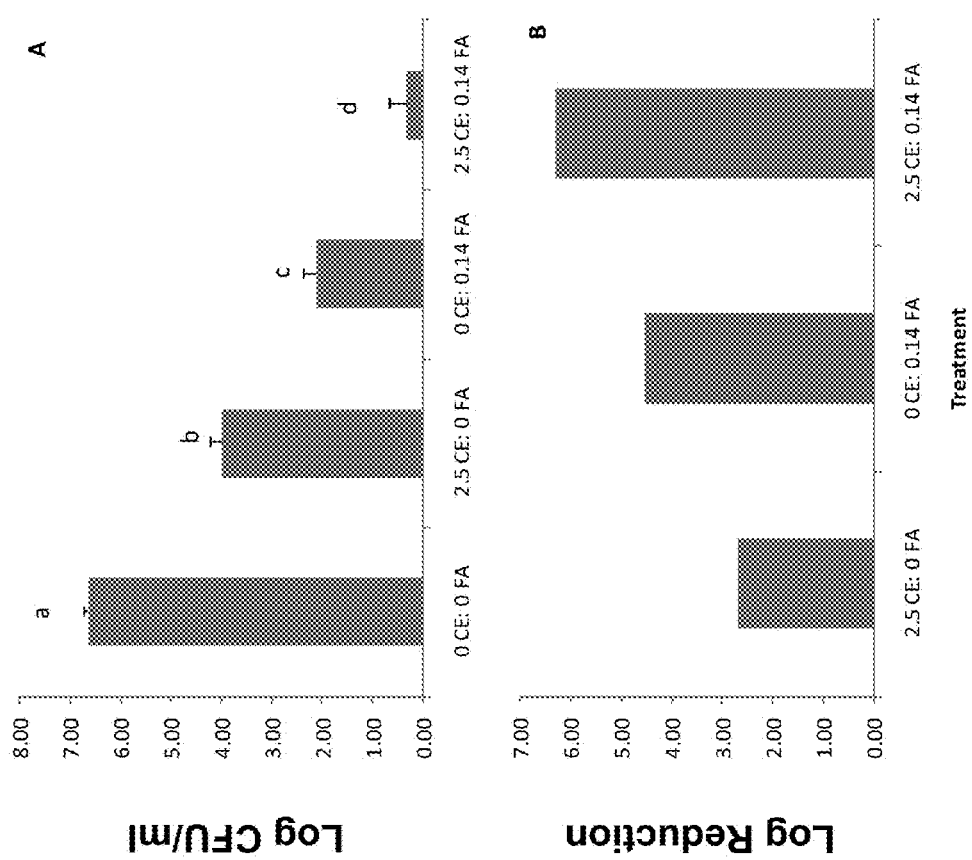
FIGS. 3A-3B are bar graphs showing the log number of *Alicyclobacillus* CFU in apple juice treated with extract (CE, mg PAC/8 oz) and/or fumaric acid (%). Mean+sem, n=3. (A) Significant differences are indicated by different letters. (B) Log reduction in the number of *Alicyclobacillus* CFU.

As shown in FIGS. 3 and 4, the magnitude of ACB inhibition by extract and fumaric acid was quantified in apple juice and orange juice. Both extract and fumaric acid significantly inhibited ACB growth in apple juice (FIG. 3A). The combination of extract and fumaric acid, however resulted in a synergistic reduction in ACB growth (ANOVA: p<0.001). There was a six log reduction in ACB growth in apple juice with the combined application of extract and fumaric acid (FIG. 3B). These data support that the combination of extract and fumaric acid synergistically reduced the growth of ACB in apple juice, resulting in a >6 log reduction in the number of CFU.

Figures 4A, 4B:
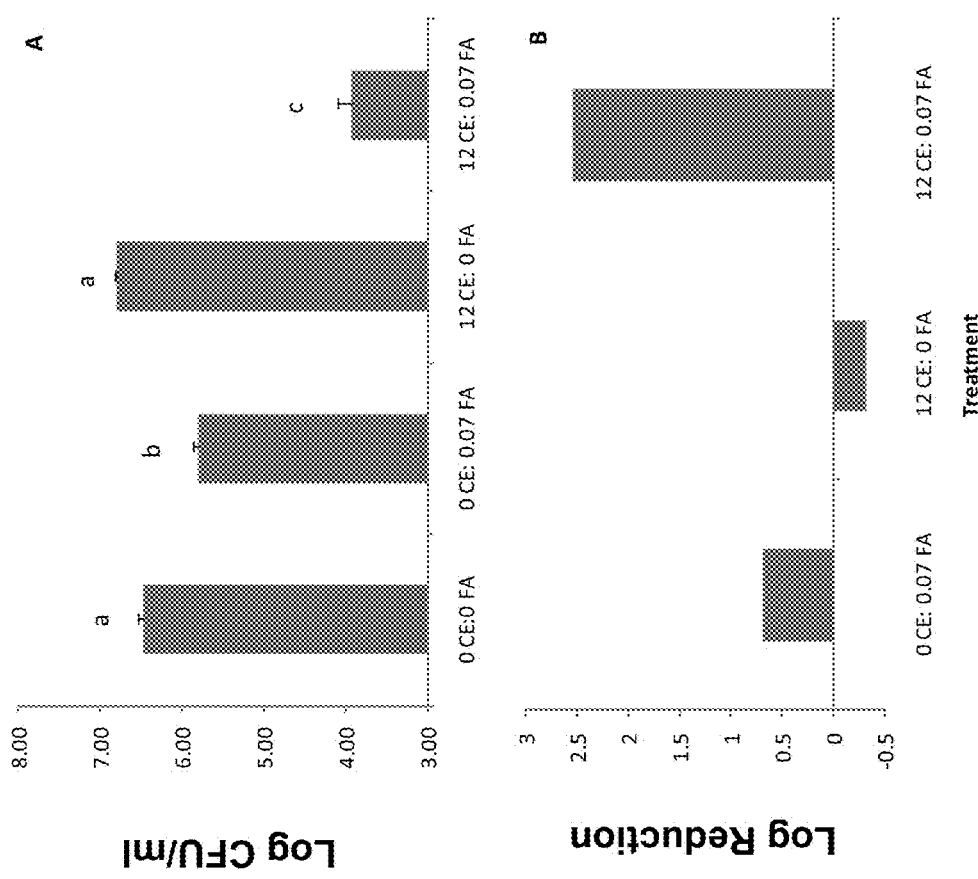
FIGS. 4A-4B are bar graphs showing the log number of *Alicyclobacillus* CFU in orange juice treated with extract (CE, mg PAC/8 oz) and/or fumaric acid (%). Mean+sem, n=3. (A) Significant differences are indicated by different letters. (B) Log reduction in the number of *Alicyclobacillus* CFU.

As shown in FIG. 4, in orange juice, ACB was inhibited by fumaric acid alone. Furthermore, the combination of extract and fumaric acid synergistically inhibited ACB in orange juice (ANOVA: p<0.001). There was no effect of extract alone (FIG. 4A). The combination of extract and fumaric acid resulted in >2 log reduction in ACB growth (FIG. 4B). These data support that the combination of extract and fumaric acid synergistically reduced the growth of ACB in orange juice, resulting in a >2 log reduction in the number of CFU.

Accordingly, the data presented herein support that the combination of extract and fumaric acid can used effectively to reduce spoilage of fruit juices by ACB.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A composition comprising isolated fumaric acid and isolated phenolics, wherein the isolated phenolics comprises proanthocyanidins (PACs) and wherein the ratio of fumaric acid to PACs is between about 4000:1 and about 50:1.

2. The composition of claim 1, wherein the ratio is about 50:1.

3. The composition of claim 1, wherein the ratio is about 60:1.

4. The composition of claim 1, wherein the ratio is about 70:1.

5. The composition of claim 1, wherein the ratio is about 80:1.

6. The composition of claim 1, wherein the ratio is about 90:1.

7. The composition of claim 1, wherein the ratio is about 100:1.

8. The composition of claim 1, wherein the isolated phenolics are obtained by:
   (i) obtaining a liquid feedstock comprising cranberry juice;
   (ii) contacting the feedstock with a resin that binds phenolics, and that does not substantially bind to sugar and organic acids, for a time and under conditions sufficient for phenolics in the feedstock to bind to the resin, wherein the resin is an aliphatic ester resin;
   (iii) contacting the resin with a wash solution, wherein the wash solution does not substantially reduce the amount of phenolics bound to the resin;
   (iv) contacting the resin with an elution solution comprising a solvent, wherein the elution solution substantially decreases the amount of phenolics bound to the resin; and
   (v) collecting the elution solution.

9. The composition of claim 1, wherein the composition is a powdered composition.

10. The composition of claim 1, wherein the composition is a liquid composition.

11. A composition comprising isolated fumaric acid and isolated phenolics, wherein the isolated phenolics comprises proanthocyanidins (PACs) and wherein the ratio of fumaric acid to PACs is between about 3571:1 and about 121:1.

12. The composition of claim 11, wherein the isolated phenolics are obtained by:
   (i) obtaining a liquid feedstock comprising cranberry juice;
   (ii) contacting the feedstock with a resin that binds phenolics, and that does not substantially bind to sugar and organic acids, for a time and under conditions sufficient for phenolics in the feedstock to bind to the resin, wherein the resin is an aliphatic ester resin;
   (iii) contacting the resin with a wash solution, wherein the wash solution does not substantially reduce the amount of phenolics bound to the resin;
   (iv) contacting the resin with an elution solution comprising a solvent, wherein the elution solution substantially decreases the amount of phenolics bound to the resin; and
   (v) collecting the elution solution.

13. The composition of claim 11, wherein the composition is a powdered composition.

14. The composition of claim 11, wherein the composition is a liquid composition.

* * * * *